United States Patent
Matsumura et al.

(10) Patent No.: US 11,153,855 B2
(45) Date of Patent: Oct. 19, 2021

(54) TRANSMISSION APPARATUS AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 73 days.

(21) Appl. No.: 16/333,880

(22) PCT Filed: Sep. 14, 2017

(86) PCT No.: PCT/JP2017/033207
§ 371 (c)(1),
(2) Date: Mar. 15, 2019

(87) PCT Pub. No.: WO2018/052061
PCT Pub. Date: Mar. 22, 2018

(65) Prior Publication Data
US 2019/0208520 A1    Jul. 4, 2019

(30) Foreign Application Priority Data

Sep. 16, 2016  (JP) .............................. JP2016-182135

(51) Int. Cl.
*H04W 72/04* (2009.01)
*H04J 1/00* (2006.01)
*H04L 27/26* (2006.01)

(52) U.S. Cl.
CPC .......... *H04W 72/0413* (2013.01); *H04J 1/00* (2013.01); *H04L 27/2613* (2013.01); *H04L 27/2636* (2013.01)

(58) Field of Classification Search
CPC ... H04W 72/0413; H04J 1/00; H04L 27/2613; H04L 27/2636
See application file for complete search history.

(56) References Cited

U.S. PATENT DOCUMENTS

2008/0316961 A1*  12/2008  Bertrand ............. H04W 74/004
                                            370/329
2013/0242930 A1*  9/2013  Takahashi ......... H04W 72/0453
                                            370/329

(Continued)

OTHER PUBLICATIONS

Kim et al., "UL Channel Multiplexing for Newrat in Unlicensed Band", U.S. Appl. No. 62/371,852, filed Aug. 8, 2016 (Year: 2016).*

(Continued)

*Primary Examiner* — Thinh D Tran
(74) *Attorney, Agent, or Firm* — Osha Bergman Watanabe & Burton LLP

(57) ABSTRACT

The present invention is designed so that control information and reference signals that are transmitted by using control channels can be multiplexed adequately in the UL/DL in future radio communication systems. According to the present invention, A transmission apparatus transmits control information by using a control channel, and this transmission apparatus has a multiplexing section that multiplexes the control information and a reference signal in a time domain in one symbol, and a transmission section that transmits the control information and the reference signal.

4 Claims, 17 Drawing Sheets

TRANSMISSION SEQUENCE (UCI+RS) BEFORE ENTRY TO DFT (BEFORE S/P CONVERSION)

(56) References Cited

U.S. PATENT DOCUMENTS

| | | | | |
|---|---|---|---|---|
| 2015/0071201 A1* | 3/2015 | Larsson | ............... | H04L 5/001 |
| | | | | 370/329 |
| 2017/0331670 A1* | 11/2017 | Parkvall | ............. | H04L 41/0233 |
| 2018/0048441 A1* | 2/2018 | Bagheri | ................ | H04L 5/0078 |
| 2018/0167186 A1* | 6/2018 | Shao | ..................... | H04L 5/0048 |
| 2019/0246411 A1* | 8/2019 | Kim | ........................ | H04L 5/001 |
| 2020/0092867 A1* | 3/2020 | Wang | ................... | H04W 16/32 |

OTHER PUBLICATIONS

International Search Report issued in PCT/JP2017/033207 dated Nov. 7, 2017 (2 Pages).
Written Opinion of the International Searching Authority issued in PCT/JP2017/033207 dated Nov. 7, 2017 (3 Pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; stage 2 (Release 8)"; Mar. 2010 (149 Pages).

* cited by examiner

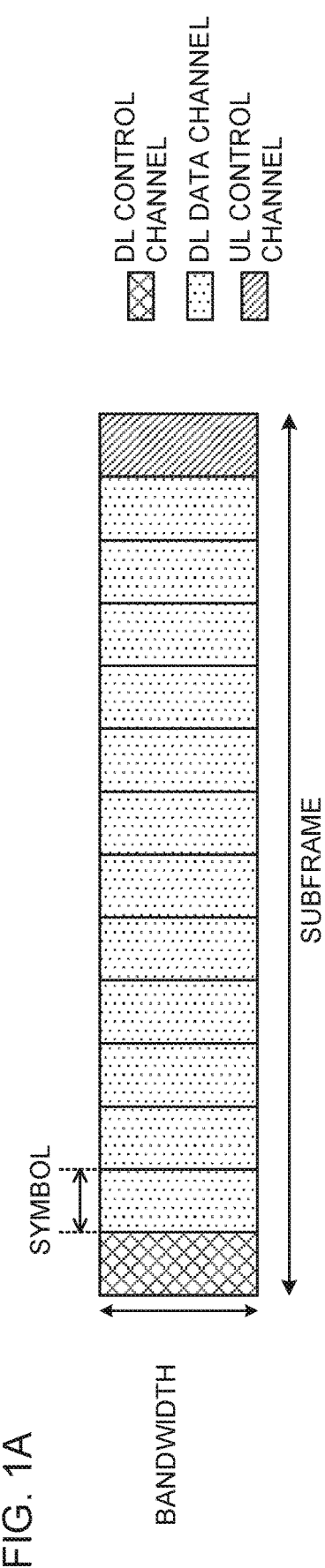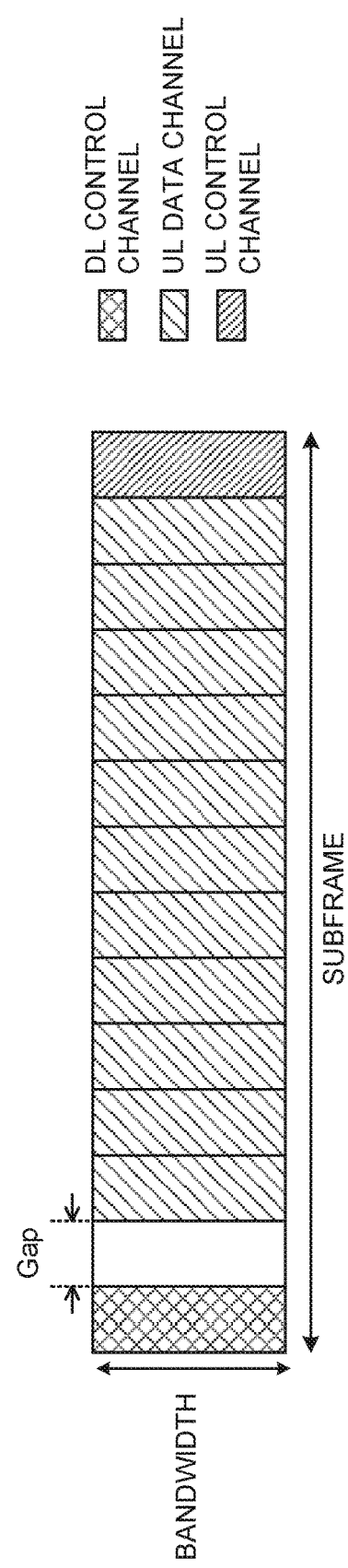

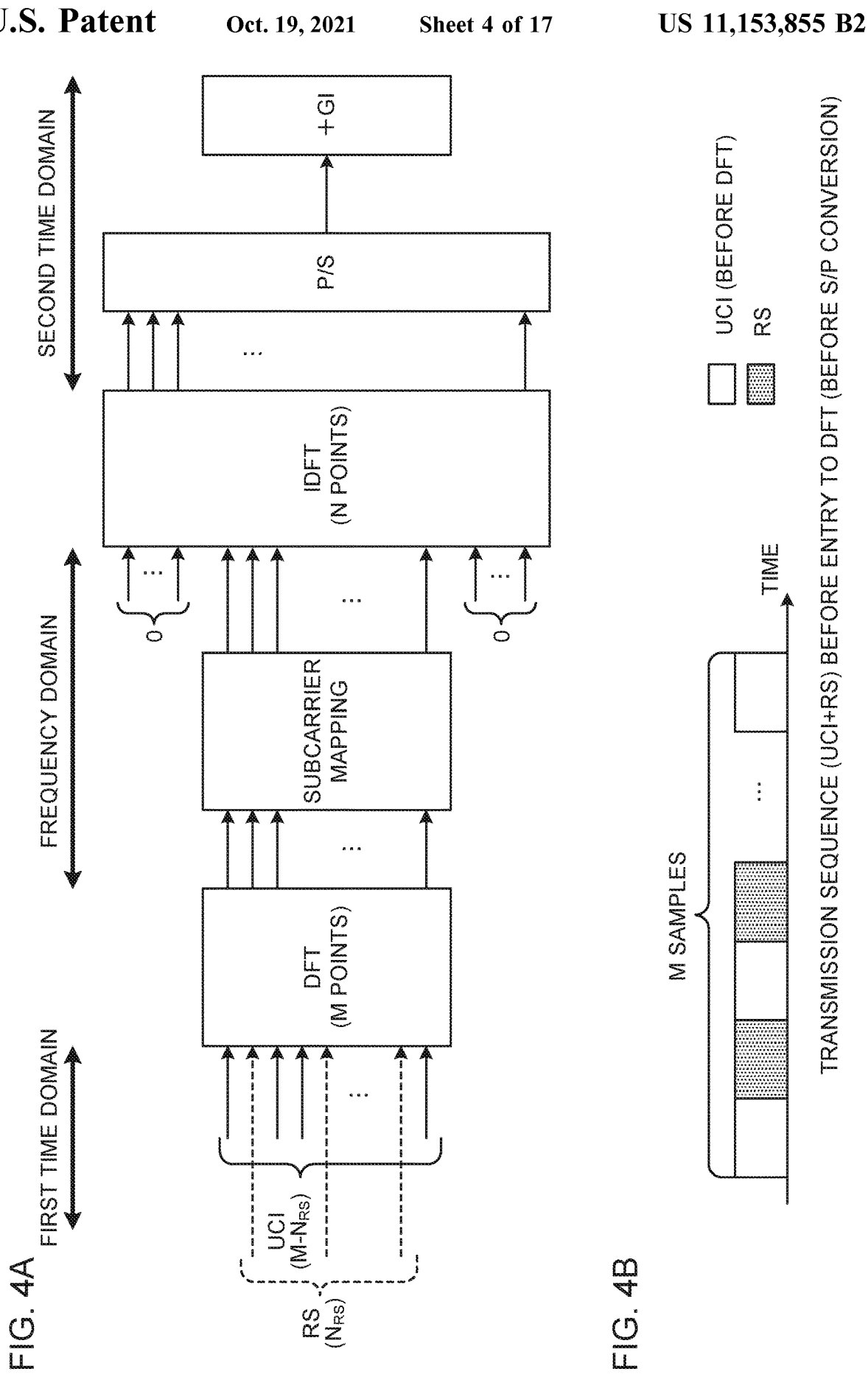

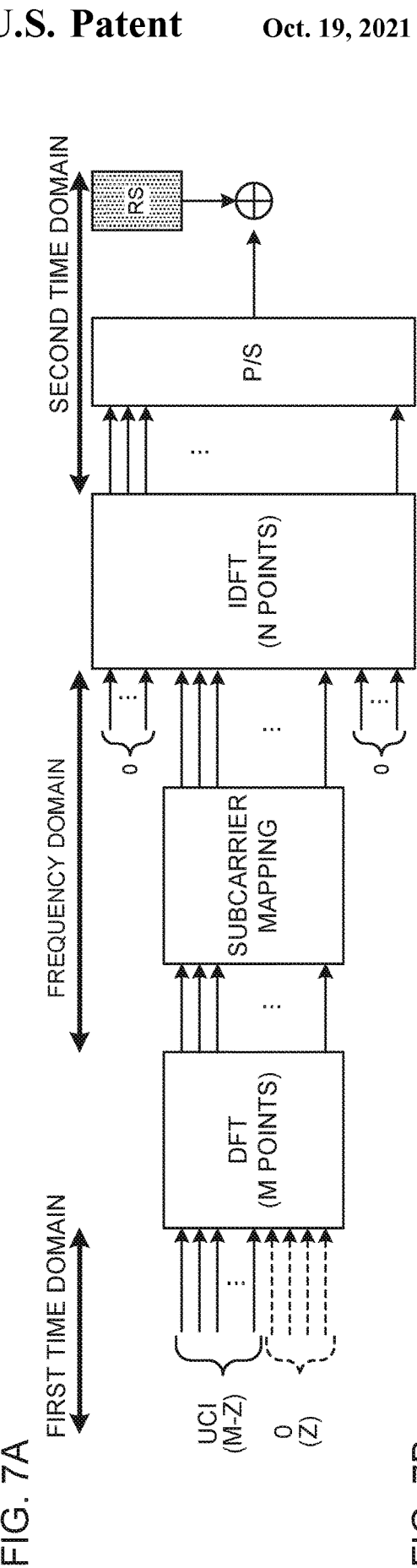
FIG. 7A
FIG. 7B
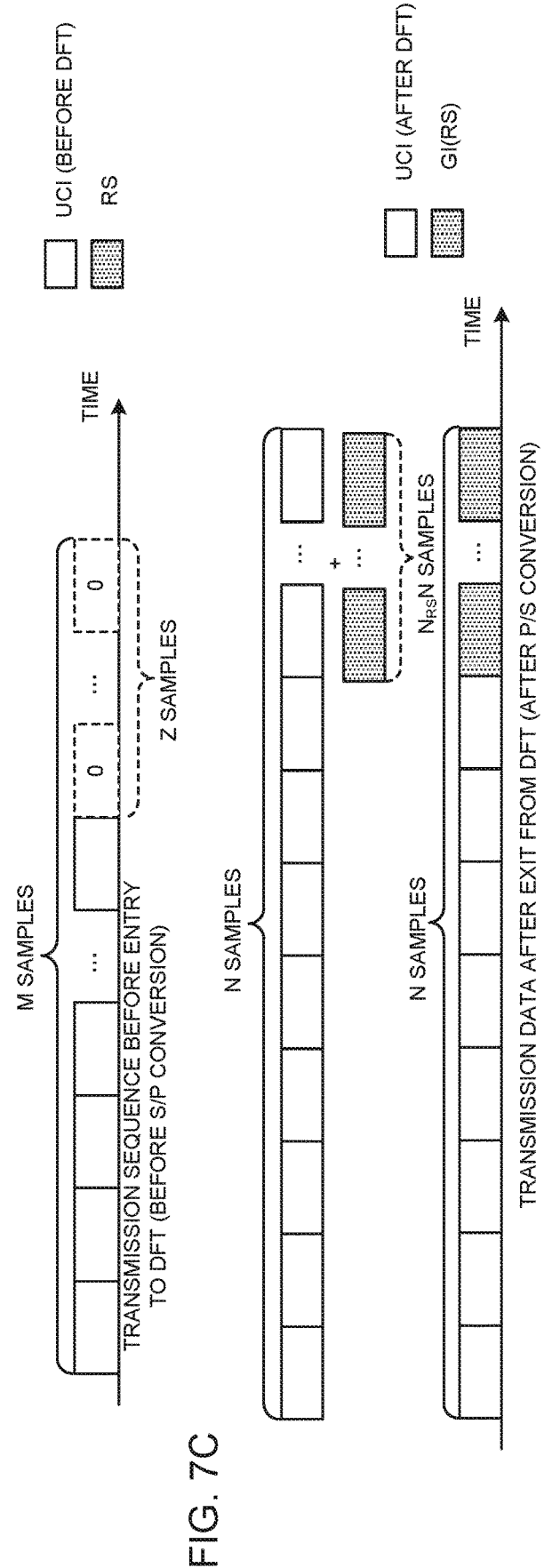
FIG. 7C

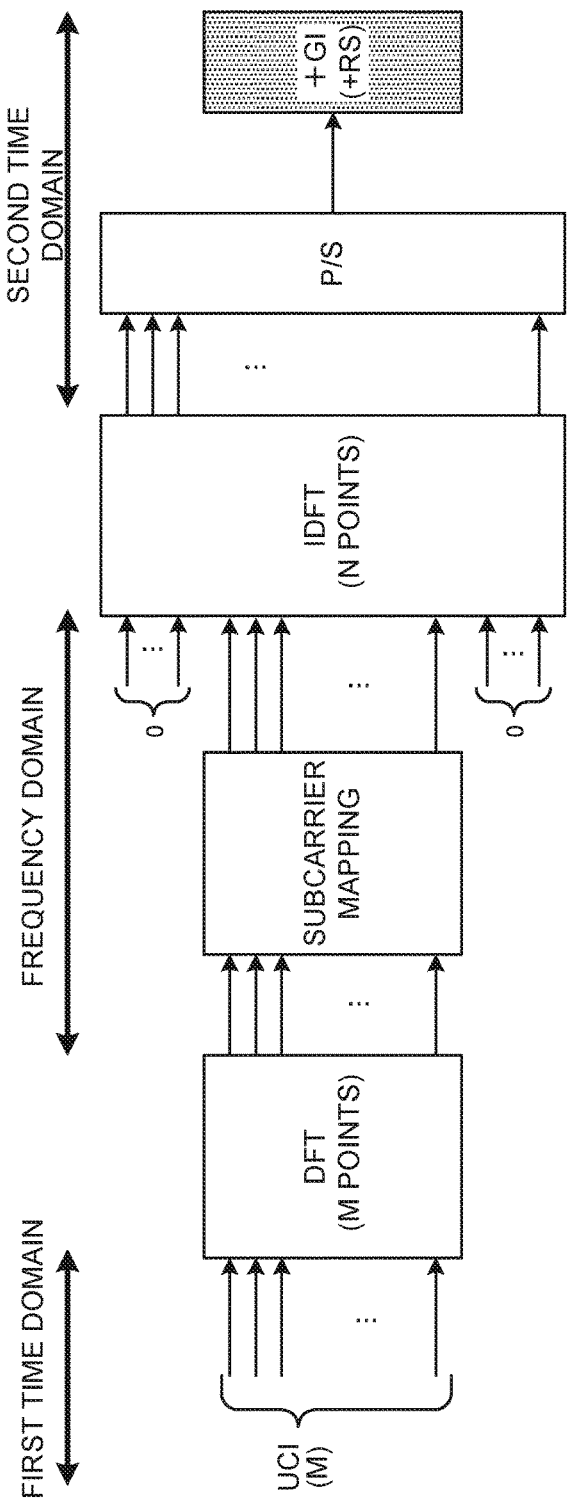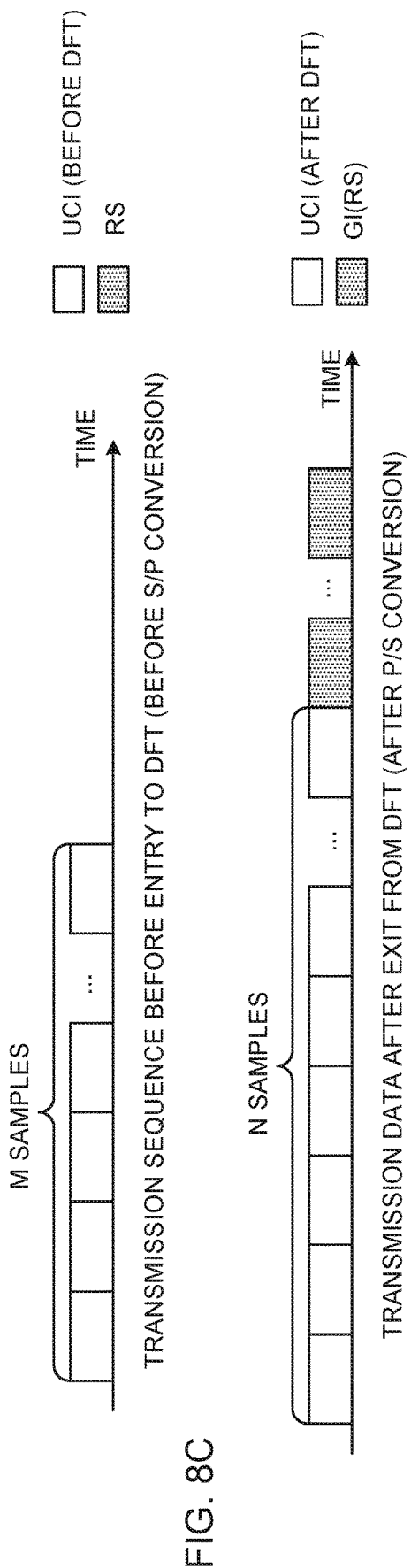
FIG. 8A
FIG. 8B
FIG. 8C

▨ UL CONTROL CHANNEL

TRANSMISSION APPARATUS AND RADIO COMMUNICATION METHOD

TECHNICAL FIELD

The present invention relates to transmission apparatus and a radio communication method in next-generation mobile communication systems.

BACKGROUND ART

In the UMTS (Universal Mobile Telecommunications System) network, the specifications of long-term evolution (LTE) have been drafted for the purpose of further increasing high speed data rates, providing lower delays and so on (see non-patent literature 1). In addition, successor systems of LTE are also under study for the purpose of achieving further broadbandization and increased speed beyond LTE (referred to as, for example, "LTE-A (LTE-Advanced)," "FRA (Future Radio Access)," "4G," "5G," "5G+(plus)," "NR (New RAT)," "LTE Rel. 14," "LTE Rel. 15 (or later versions)," and so on).

In existing LTE systems (for example, LTE Rel. 8 to 13), downlink (DL) communication and/or uplink (UL) communication are performed using 1-ms transmission time intervals ("TTIs," which may be also referred to as "subframes" and so on). This 1-ms TTI is the unit of time it takes to transmit one channel-encoded data packet, and is the processing unit in, for example, scheduling, link adaptation, retransmission control (HARQ (Hybrid Automatic Repeat reQuest)) and so on.

Also, in the DL of existing LTE systems (LTE Rel. 8 to 13), multi-carrier communication is employed. To be more specific, in the DL, orthogonal frequency division multiplexing (OFDM), which frequency-division-multiplexes (FDM) multiple subcarriers, is used.

On the other hand, in the UL of existing LTE systems (LTE Rel. 8 to 13), single-carrier communication is employed. To be more specific, in the UL, DFT-S-OFDM (Discrete Fourier Transform-Spread-Orthogonal Frequency Division Multiplexing) is used. DFT-S-OFDM provides a lower peak-to-average power ratio (PAPR) than OFDM, and therefore is suitable for the UL where user terminals make transmission.

Also, in UL control channel formats (for example, PUCCH (Physical Uplink Control Channel) formats 1 to 5) supported in existing LTE systems (LTE Rel. 13), all symbols that are available in a subframe (for example, fourteen symbols when a normal cyclic prefix (CP) is used) are used, and frequency hopping is applied in units of slots.

Also, in existing PUCCH formats 1 to 5, uplink control information (UCI) and reference signals (RSs) (for example, the demodulation reference signal (DM-RS) for a UL control channel, the reference signal (SRS (Sounding Reference Signal) for channel state sounding (estimation))) are allocated to different symbols in a subframe. That is, in existing PUCCH formats 1 to 5, UCI and RSs are time-division-multiplexed (TDM).

Note that UCI contains at least one of retransmission control information (ACK (ACKnowledgement) or NACK (Negative ACK), A/N, HARQ-ACK, etc.) in response to a DL shared channel (DL data), channel state information (CSI), and a scheduling request (SR).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall Description; Stage 2 (Release 8)," April, 2010

SUMMARY OF INVENTION

Technical Problem

In future radio communication systems (for example, LTE Rel. 14, LTE Rel. 15 or later versions, 5G, NR, etc.), research is underway to support UL control channels constituted by fewer symbols (for example, at least one symbol) than existing PUCCH formats 1 to 5.

However, the methods of multiplexing UCI and RSs used in existing PUCCH formats 1 to 5 may not be applicable to UL control channels constituted by a minimum of one symbol. In existing PUCCH formats 1 to 5, symbols dedicated to reference signals are provided, and UCI and RSs are transmitted in different symbols. Therefore, in order to multiplex UCI and an RS, at least two symbols (at least four symbols if frequency hopping is applied) are required.

It then follows that, envisaging future radio communication systems, there is a demand for a method for multiplexing UCI and RSs (for example, DM-RS and/or SRS) that is suitable for new UL control channel formats (for example, a PUCCH format comprised of a minimum of one symbol). Similarly, for future radio communication systems, there is a demand for a method for multiplexing downlink control information (DCI) and an RS that is suitable for a new DL control channel format. In this way, for the UL and/or the DL (UL/DL) in future radio communication systems, a method for multiplexing control information (UCI and/or DCI) that is suitable for new control channel formats (UL/DL control channels) is needed.

The present invention has been made in view of the above, and it is therefore an object of the present invention to provide transmission apparatus and a radio communication method, whereby control information and reference signals, transmitted using control channels, can be multiplexed adequately in the UL/DL in future radio communication systems.

Solution to Problem

According to one aspect of the present invention, a transmission apparatus transmits control information by using a control channel, and this transmission apparatus has a multiplexing section that multiplexes the control information and a reference signal in a time domain in one symbol, and a transmission section that transmits the control information and the reference signal.

Advantageous Effects of Invention

According to the present invention, control information and reference signals that are transmitted using control channels can be multiplexed adequately in the UL/DL in future radio communication systems.

BRIEF DESCRIPTION OF DRAWINGS

FIGS. 1A and 1B are diagrams to show examples of subframe structures for use in future radio communication systems;

FIGS. 4A and 4B are diagrams to show an example of a DFT-S-OFDM transmitter, according to a first example of the present embodiment;

FIGS. 7A to 7C are diagrams to show an example of a DFT-S-OFDM transmitter according to a second example of the present embodiment;

FIGS. 8A to 8C are diagrams to show an example of a DFT-S-OFDM transmitter according to a third example of the present embodiment;

DESCRIPTION OF EMBODIMENTS

Figure 2A:
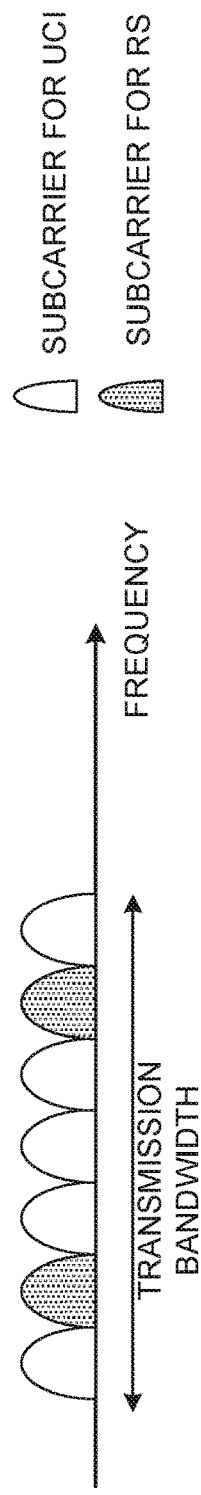
FIGS. 2A and 2B are diagrams to show examples of frequency division multiplexing of UCI and an RS in one symbol.

FIG. 1 are diagrams to show examples of possible subframe structures in future radio communication systems. Note that a subframe structure may be referred to as a "subframe type," a "frame structure," a "frame type," a "slot configuration," a "slot structure," a "slot type," and so on.

For example, FIG. 1A shows a subframe structure, in which a DL control channel (for example, a PDCCH (Physical Downlink Control CHannel)), a DL data channel (for example, a PDSCH (Physical Downlink Shared CHannel), which is also referred to as a "DL shared channel" and so on), and a UL control channel (for example, a PUCCH) are arranged (this subframe structure may be referred to as a "DL centric subframe structure" and/or others). A user terminal controls receipt of the DL data channel based on downlink control information (DCI) that is transmitted in the DL control channel.

Also, the user terminal can feed back retransmission control information (also referred to as "HARQ-ACK (Hybrid Automatic Repeat reQuest-ACKnowledgment)," "ACK" or "NACK" (ACK/NACK) and so on) in response to the DL data channel via the UL control channel in the same time period (also referred to as, for example, "NR TDD subframe," "transmission time interval (TTI)," "subframe" and so on). Note that the user terminal may feed back this ACK/NACK in the UL control channel or the UL data channel in a subsequent subframe.

FIG. 1B shows a subframe structure, in which a DL control channel (for example, a PDCCH), a UL data channel (for example, a "PUSCH (Physical Uplink Shared CHannel)," which is also referred to as a "UL shared channel," and so on) and a UL control channel (for example, a PUCCH) are arranged (this subframe structure may be referred to as a "UL centric subframe structure" and/or others). Based on DCI that is transmitted in the DL control channel, a user terminal may transmit the UL data channel (UL data, channel state information (CSI), etc.) in the same subframe. Note that the user terminal may transmit this UL data channel in subsequent subframes.

The subframes shown in FIGS. 1A and 1B illustrate assignments, in which control (scheduling) of transmission and receipt is completed within the same subframe. This type of assignment is referred to as "self-contained assignment." Also, subframes that are subject to self-contained assignment are referred to as "self-contained subframes," "self-contained TTIs," "self-contained symbol sets" and so on.

In self-contained subframes, the user terminal may receive the DL data channel based on the DL control channel, and transmit an HARQ-ACK in response to the DL data channel. The use of self-contained subframes can realize feedback with ultra-low delay of 1 ms or less, for example, so that latency can be reduced.

Note that the subframe structures shown in FIGS. 1A and 1B are simply examples, and are by no means limiting. The locations of individual channels can be switched as appropriate, and part of the channels shown in FIGS. 1A and 1B may be placed in subframes. Also, the bandwidths shown in FIGS. 1A and 1B have to include at least the bandwidths allocated to the UL/DL data channels, and need not match the system bandwidth.

Also, although varying channels are divided in time in FIGS. 1A and 1B, the DL control channel and the UL/DL data channel need not be time-multiplexed, and may be frequency-multiplexed/code-multiplexed in the same time period (for example, in the same symbol). Likewise, the UL control channel and the UL/DL data channel need not be time-multiplexed and may be frequency-multiplexed/code-multiplexed in the same time period (for example, in the same symbol).

Also, although not illustrated in FIG. 1A, a time to switch from DL to UL (gap period) may be provided between the DL data channel and the UL control channel. Furthermore, although not illustrated in FIGS. 1A and 1B, a time to switch from UL to DL (gap period) may be provided between the UL control channel and the time where the next subframe starts.

Also, in FIG. 1B, a gap period of one symbol is configured between the DL control channel and the UL data channel, but this gap period may be two or more symbols, and the number of symbols needs not be an integer. Furthermore, the gap period between the UL control channel and the time the next subframe starts is not explicitly shown on the channel format, and may be configured, in practical operation, by adjusting the configuration time of timing advance (TA) that is applied to UL signals.

Also, in FIGS. 1A and 1B, a UL/DL control channel is comprised of one symbol, but a UL/DL control channel may be comprised of a plurality of symbols (for example, two or three symbols). When the number of symbols in a UL/DL control channel is configured large, the coverage can be expanded, but the overhead will increase. Therefore, in order to prevent an increase in overhead, it may be possible to configure a UL/DL control channel with, for example, a minimum of one symbol.

Now, UL control channels (PUCCH formats 1 to 5) of existing LTE systems are transmitted in all symbols that are available in a subframe (for example, fourteen symbols when a normal cyclic prefix (CP) is used (or thirteen symbols when SRS is transmitted)). In addition, in existing PUCCH formats 1 to 5, a specific symbol in a subframe is used exclusively for a reference signal (for example, DM-RS).

However, there is a possibility that the method of multiplexing UCI and a reference signal (RS) according to existing PUCCH formats 1 to 5 cannot be applied to UL control channels that may be, as exemplified in FIGS. 1A and 1B, comprised of a minimum of one symbol. In existing PUCCH formats 1 to 5, a specific symbol is used exclusively for an RS, and, to multiplex UCI and an RS, at least two symbols are required (or at least four symbols if frequency hopping is applied). By contrast with this, in future radio communication systems, a UL control channel may be constituted by a minimum of one symbol, UCI and an RS need to be multiplexed in one symbol.

It then necessarily follows that a method for multiplexing UCI and an RS, that is suitable for a new UL control channel format (for example, a PUCCH format comprised of a minimum of one symbol) is needed. As a method for multiplexing UCI and an RS in one symbol, it may be possible to frequency-division-multiplex UCI and an RS by using a plurality of subcarriers (or carriers).

Figure 2B:
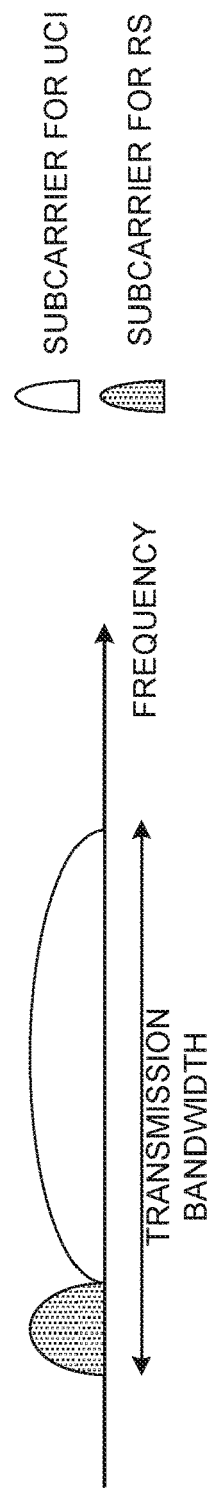

FIG. 2 are diagrams to show examples of frequency division multiplexing of UCI and an RS in one symbol. FIG. 2A shows an example of multi-carrier communication (for example, OFDM), and FIG. 2B shows an example of single-carrier communication (for example, DFT-S-OFDM). Single-carrier communication is excellent in transmission power efficiency, and therefore is anticipated to be used in future radio communication systems (for example, in high frequency bands or UL).

As shown in FIG. 2A, in multi-carrier communication where a plurality of subcarriers are used, it may be possible to frequency-division-multiplex UCI and an RS in one symbol. Meanwhile, when, as shown in FIG. 2B, UCI and an RS are frequency-division-multiplexed by using a number of different carriers in single-carrier communication, the PAPR might increase.

It then follows that, frequency-division-multiplexing UCI and an RS in one symbol is suitable for multi-carrier communication, but is not suitable for single-carrier communication. Also, when DCI and an RS are frequency-division-multiplexed in one symbol while single-carrier communication is carried out in the DL, the same problem as that on the UL might arise.

So, the present inventors have come up with the idea of multiplexing UCI and an RS in one symbol, without increasing the PAPR, even in single-carrier communication, by multiplexing control information and an RS in the time domain within one symbol and transmitting this, as one example of the method for multiplexing control information (UCI and/or DCI) and an RS that is suitable for new UL/DL control channel formats.

Now, the present embodiment will be described below in detail. Also, while the present embodiment is suitable for use in single-carrier communication, where DFT-S-OFDM and/ or others are used, the present invention is also applicable to multi-carrier communication where OFDM and/or others are used.

Also, although multiplexing of UCI and RSs that are transmitted in UL control channels will be described below, the present embodiment can also be used as appropriate to multiplex UCI and/or UL data and RSs that are transmitted in UL shared channels.

Furthermore, although examples pertaining to the UL—that is, examples in which the transmission apparatus refers to a user terminal and the receiving apparatus refers to a network (for example, a radio base station)—will be primarily described below, the present invention is also applicable to examples based on the DL—that is, examples in which the transmission apparatus refers to a radio base station and the receiving apparatus refers to a user terminal. In the DL, DCI and/or DL data, and an RS (for example, DM-RS, CSI-RS (Channel State Information-Reference Signal), CRS (Cell-specific Reference Signal), etc.) may be multiplexed in the time domain within one symbol.

(Single-Carrier Communication)

According to the present embodiment, a user terminal transmits UCI by using a UL control channel. The user terminal multiplexes this UCI with an RS in the time domain in one symbol, and transmits this in a single carrier (for example, DFT-S-OFDM). This RS may be at least one of the DM-RS for use for demodulating the UL control channel, and the SRS for use for channel state sounding.

Figure 3:
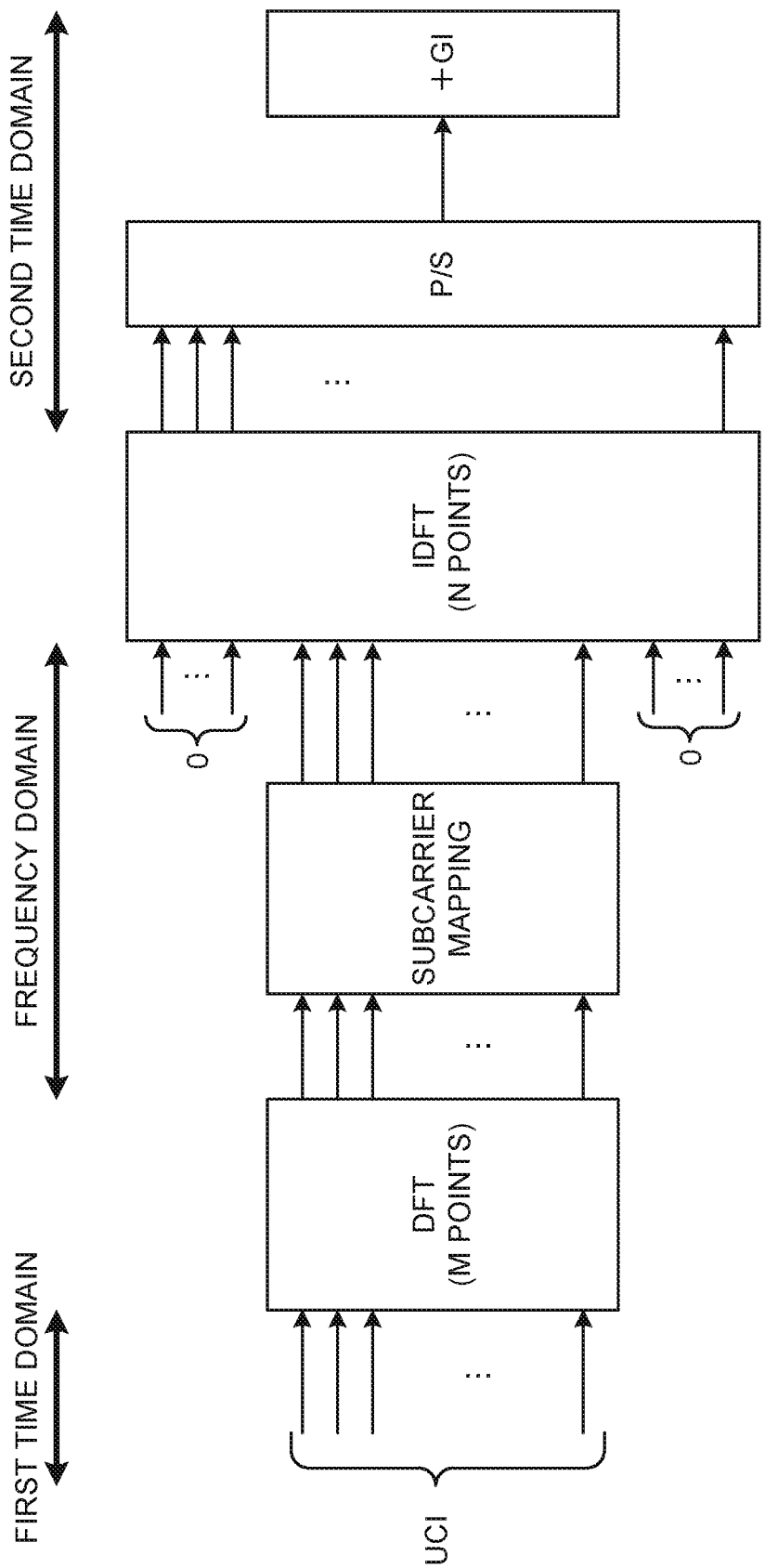
FIG. 3 is a diagram to show an example of an existing DFT-S-OFDM transmitter.

FIG. 3 is a diagram to show an example of an existing DFT-S-OFDM transmitter. As shown in FIG. 3, in DFT-S-OFDM, UCI (modulated symbols gained by encoding UCI at a predetermined coding rate and modulating this based on a predetermined modulation scheme (for example, QPSK (Quadrature Phase Shift Keying), 16QAM (16 Quadrature Amplitude Modulation), etc.)) is subjected to an M-point discrete Fourier transform (DFT), and converted from a first time domain to the frequency domain.

Outputs of the DFT are mapped to M subcarriers, subjected to an N-point inverse discrete Fourier transform (IDFT) and converted from the frequency domain to a second time domain. Here, N>M holds, and information that is input to the IDFT but not used is configured to zero. By this means, IDFT outputs are signals with little instantaneous power fluctuation, and their bandwidth depends on M.

Outputs from the IDFT are subjected to parallel/serial (P/S) conversion. Guard intervals (GIs) are appended to the transmission sequence after the P/S conversion. In this way, signals having characteristics of single-carrier communication are generated by the DFT-S-OFDM transmitter, and transmitted in one symbol.

According to the present embodiment, as shown in FIG. 3, the user terminal multiplexes UCI and an RS in the time domain within one symbol (the first or the second time domain), thereby placing and transmitting the UCI and the RS on a single carrier. To be more specific, the user terminal may multiplex UCI and an RS in the first time domain before entry to a DFT (first example), or multiplex UCI and an RS in the second time domain after exit from an IDFT (second and third examples). By this means, it is possible to multiplex UCI and an RS in one symbol while maintaining characteristics of single-carrier communication (where, for example, there is little instantaneous power fluctuation, less PAPR than in multi-carrier communication and so forth).

First Example

According to a first example of the present invention, a user terminal multiplexes UCI and RSs in a first time domain provided before a DFT. To be more specific, the user terminal may insert RS sequences in a UCI sequence in a first time domain provided before a DFT.

FIG. 4 are diagrams to show an example of a DFT-S-OFDM transmitter according to the first example. According to the first example, as shown in FIG. 4A, a transmission sequence of M samples, before entry to a DFT, is comprised of a UCI sequence and an RS sequence.

As shown in FIG. 4B, in the transmission sequence before entry to a DFT a predetermined number (predetermined length) ($N_{RS}$) of RS sequences are inserted at predetermined locations in a UCI sequence before serial/parallel (S/P) conversion, and M samples are generated. The transmission sequence comprised of M samples is input to a DFT after S/P conversion and converted from the time domain to the frequency domain. Outputs of the DFT are mapped to M subcarriers, subjected to an N-point IDFT, and converted from the frequency domain to the time domain. The processing after the exit from the IDFT is the same as shown in FIG. 3.

As shown in FIG. 4A, when UCI and RS are multiplexed in the first time domain before entry to a DFT, the UCI and the RSs can be placed and transmitted on a single carrier. The receiving apparatus (for example, a radio base station) can de-multiplex the UCI and the RSs by removing the guard intervals, performing a DFT of size N, and performing an IDFT of size M. The receiving apparatus performs channel estimation using these RS sequences, demodulates UL control channels based on the result of channel estimation, and has UCI.

Alternatively, the receiving apparatus may detect UCI based on maximum likelihood detection (ML detection) (which may also be referred to as "correlation detection"), without performing channel estimation. To be more specific, the receiving apparatus may generate replicas of UCI (UCI replicas) (for example, four patterns are generated when the UCI is two bits), and encode and modulate these UCI replicas and RSs as in the transmission apparatus. Also, the receiving apparatus may calculate the correlation between the waveforms of transmission signals gained by the coding and modulation, and the waveforms of signals received from the transmission apparatus, for all the UCI replicas, and assume that the UCI replica to show the highest correlation has been transmitted.

To be more specific, the receiving apparatus can presume that the UCI replica where the total value of the absolute values of M sequences (or the squares of the absolute values), obtained by multiplying each element of the received signal sequences (M complex-number sequences) after the IDFT of size M by the complex conjugates of the transmission signal sequences (M complex-number sequences) obtained by encoding and modulating the UCI replicas and RSs in the same way as in the transmission apparatus, is the largest, has been sent.

Here, the RS sequences to be inserted in the UCI may be CAZAC (Constant Amplitude Zero Auto-Correlation) sequences (for example, ZC (Zadoff-Chu) sequences), may be sequence conforming to CAZAC sequences (see, for example, TS 36.211 table 5.5.1.2-1 and table 5.5.1.2-2), or may be known training sequences (known signal sequence).

Also, information to represent RS sequences (for example, the amount of phase rotation of ZC sequences, information to represent the values set forth in the above-mentioned tables (row values, column values, etc.), numbers to specify known signal sequences, and so forth) may be configured semi-statically by higher layer signaling (for example, RRC (Radio Resource Control) signaling, MAC (Medium Access Control) signaling and so forth) or broadcast information (for example, the MIB (Master Information Block) and/or SIBs (System Information Blocks)), may be configured on a dynamic basis by physical layer signaling (for example, a DL control channel), or may be configured by using at least one combination of these.

Note that, when using a known signal sequence, this known signal sequence may be set forth in the specification, or, if a plurality of prospective known signal sequences are provided for in the specification, information to specify which known signal sequences are to be used (for example, numbers associated with known signal sequences) may be given from the network.

Also, the number of RS sequences ($N_{RS}$) (also referred to as the "length of RS sequences," the "number of RS samples," etc.) may be reported (configured) from the network (for example, a radio base station), or may be determined in advance. The number of RS sequences ($N_{RS}$) may be determined per DFT size (M) (also referred to as "DFT size," "bandwidth," etc.). For example, information to represent the number of RS sequences ($N_{RS}$) may be configured semi-statically by using higher layer signaling or broadcast information, may be configured dynamically by using physical layer signaling, or may be configured by combining at least one of these.

Also, the user terminal may control the generation of UCI sequences (such as encoding, modulation, rate matching (at least one of puncturing, repetition and insertion) and so forth) based on the DFT size (M) and the number of RS sequences ($N_{RS}$). For example, the user terminal may generate a UCI sequence that is comprised of a number of samples (size) equal to the result of subtracting the number of RS sequences ($N_{RS}$) from the DFT size (M). Also, the user terminal may adjust the modulation scheme and/or the coding rate for UCI to generate a UCI sequence of $M-N_{RS}$ samples.

Also, given a UCI sequence that is larger than $M-N_{RS}$ samples, the user terminal may puncture this UCI sequence, at least partially. On the other hand, given a UCI sequence smaller than $M-N_{RS}$ samples, the user terminal may insert a specific sequence (for example, a zero sequence) in this UCI sequence, or repeat at least a part of this UCI sequence (repetition)

Next, an example of how a transmission sequence including UCI and RSs (that is, example of multiplexing UCI and RSs) is generated in the first time domain before entry to a DFT will be described in detail. In the first time domain, the user terminal may insert RS sequences in a UCI sequence that has been encoded and modulated, (first example of generation), or insert RS sequences in the UCI sequences before coding and modulation (second example of generation).

<<First Example of Generation>>

Figure 5A:
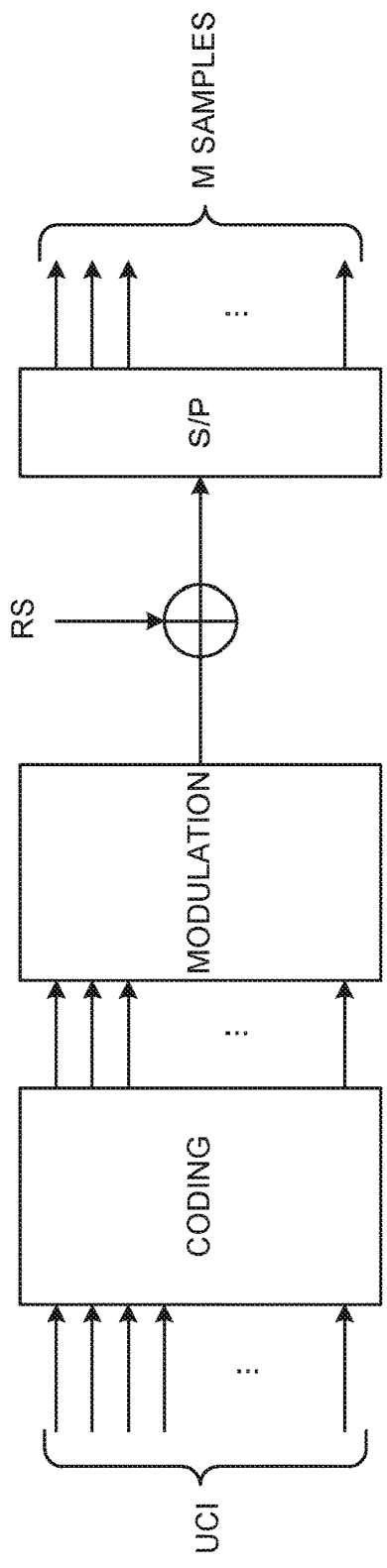
FIGS. 5A to 5C are diagrams to show a first example of generation of transmission sequences, according to the first example of the present embodiment.

FIG. 5 are diagrams to show a first example of generation of transmission sequences, according to the first example. As shown in FIG. 5A, UCI is encoded based on a predetermined coding rate (for example, 1/3) and modulated based on a predetermined modulation scheme (for example, QPSK or 16QAM). In the first example of generation, an RS sequence is inserted at a predetermined location in a UCI sequence that has been encoded and modulated. The transmission sequence of sequence length M, including an RS sequence and a UCI sequence, is subjected to S/P conversion, and input to a DFT (see FIG. 4A).

As mentioned earlier, this RS sequence may be, for example, a CAZAC sequence, a ZC sequence or a known signal sequence, which have been mentioned earlier. This RS sequence may be generated in the user terminal based on a predetermined rule, or may be specified by at least one of high layer signaling, broadcast information, and physical layer signaling.

Figure 5B:
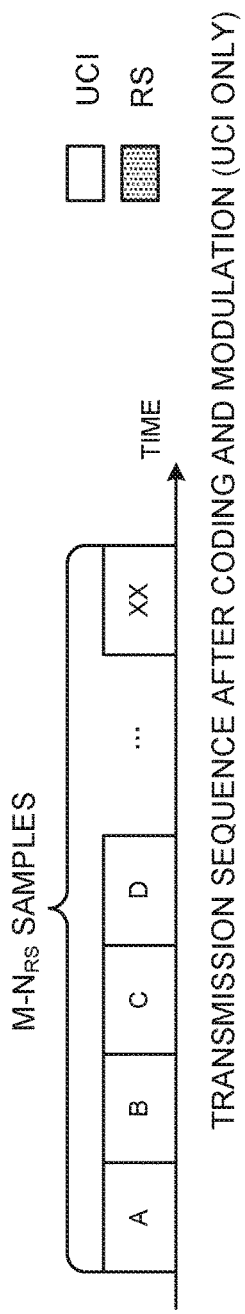

FIG. 5B shows a UCI sequence that has been encoded and modulated. The user terminal generates a UCI sequence of M-$N_{RS}$ samples by controlling at least one of the coding process, the modulation process and rate matching (repetition, puncturing or insertion of a specific sequence (zero sequence)) based on the DFT size (M) and the number of RS sequences ($N_{RS}$).

Figure 5C:
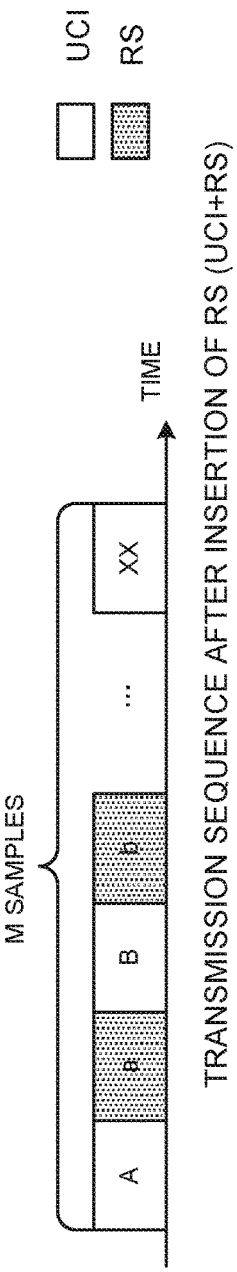

FIG. 5C shows a transmission sequence with an RS sequence inserted therein (UCI sequence+RS sequence). In FIG. 5C, RS samples are distributed (for each predetermined number of UCI samples) and inserted in the middle of the UCI sequence. Note that the locations where RS sequences are inserted in FIG. 5C are simply examples, and by no means limiting. For example, these RS sequences may be inserted consecutively at the end or at the top of the UCI sequence.

These inserting locations may be determined in advance, or may be specified by at least one of higher layer signaling, broadcast information and physical layer signaling. Alternatively, for example, a set of prospective inserting locations may be reported by higher layer signaling, and specific inserting locations in this prospective set may be specified by physical layer signaling.

Also, these inserting locations may be determined per DFT size (transmission bandwidth) M. To be more specific, for each DFT size M, a set of prospective inserting locations may be determined, specific inserting locations in this prospective set may be specified by at least one of higher layer signaling, broadcast information and physical layer signaling.

The transmission sequence of M samples, in which RS sequences of $N_{RS}$ samples are inserted in a UCI sequence of M-$N_{RS}$ samples, is subjected to S/P conversion, and input to a DFT (see FIG. 4A).

In this way, according to the first example of generation, RS sequences are inserted in a UCI sequence that has been encoded and modulated in the first time domain provided before a DFT. This makes it possible to generate RS sequence based on methods that are different from the coding and modulation method of UCI, so that it is possible to transmit RSs by using RS sequences (for example, CAZAC sequences) having better transmission power efficiency, and, consequently, achieve excellent transmission power efficiency.

<<Second Example of Generation>>

Figure 6A:
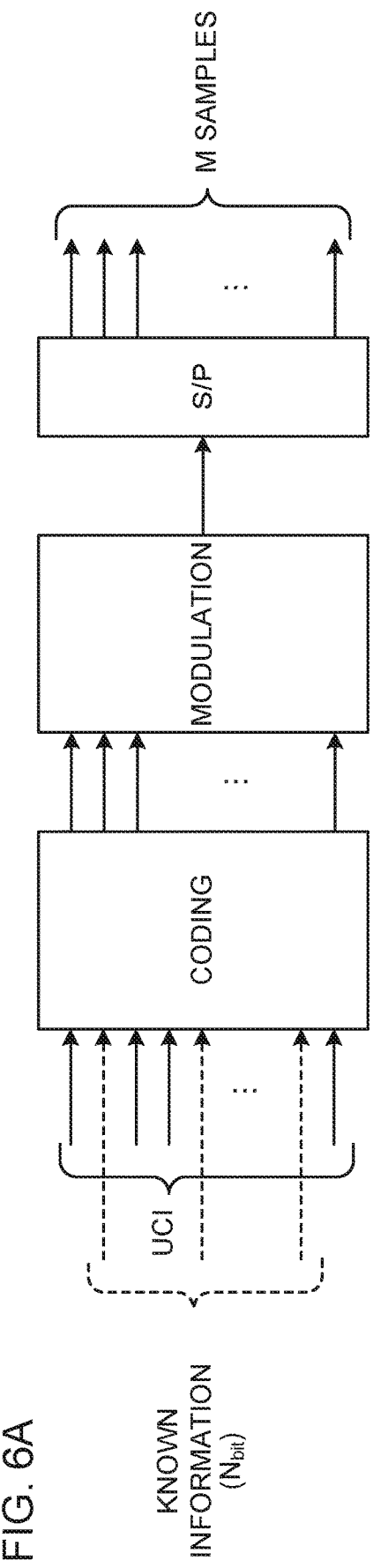
FIGS. 6A and 6B are diagrams to show a second example of generation of transmission sequences, according to the first example of the present embodiment.

FIG. 6 are diagrams to show a second example of generation of transmission sequences according to the first example. As shown in FIG. 6A, in the second example of generation, known information is inserted, as RSs, in predetermined locations in UCI that is encoded and/or modulated yet. The UCI and the known information are concatenated, encoded at a predetermined coding rate (joint-coding), and modulated based on a predetermined modulation scheme. The modulated transmission sequence is subjected to S/P conversion, and input to a DFT (see FIG. 4).

The known information may be generated in the user terminal based on predetermined rules, or may be specified by at least one of higher layer signaling, broadcast information and physical layer signaling.

Also, the number of bits of this known information ($N_{bits}$) may be determined in advance, or may be specified by at least one of higher layer signaling, broadcast information and physical layer signaling. Also, this known information and/or the number of bits of this known information may be determined per DFT size (transmission bandwidth) M.

Figure 6B:
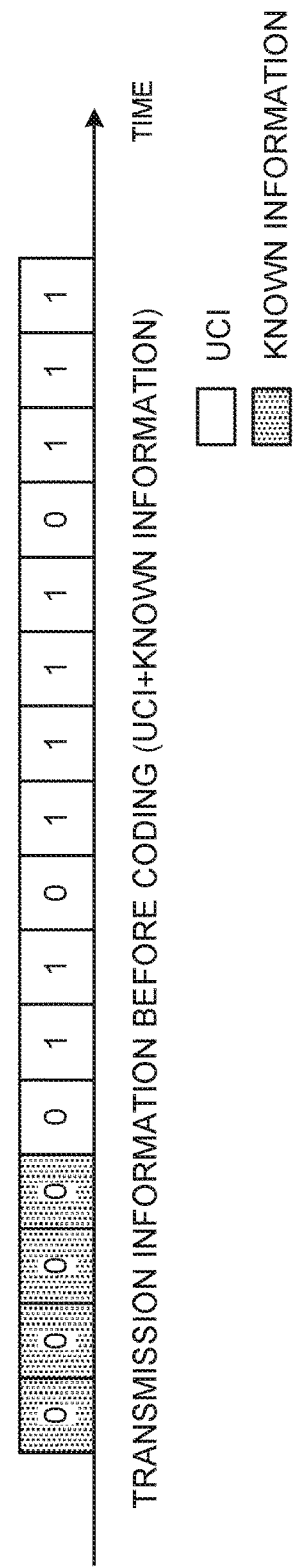

FIG. 6B shows transmission information (UCI+known information) before coding and modulation. For example, in FIG. 6B, the known information "0000" is inserted as an RS at the top of the UCI "011011110111." Note that the values of UCI and known information shown in FIG. 6B are simply examples, and these are by no means limiting. Also, the locations where known information is inserted in FIG. 6B are simply an example, and by no means limiting. For example, the known information may be inserted at the end of the UCI.

Also, these inserting locations may be determined in advance, or may be specified by at least one of higher layer signaling, broadcast information and physical layer signaling. Alternatively, for example, a set of prospective inserting locations may be reported by higher layer signaling, and specific inserting locations in this prospective set may be specified by physical layer signaling.

Also, these inserting locations may be determined per DFT size (transmission bandwidth) M. To be more specific, a set of prospective inserting locations may be determined for each DFT size M, and specific inserting locations in this prospective set may be specified by at least one of higher layer signaling, broadcast information and physical layer signaling.

The user terminal encodes the transmission information, containing UCI and known information, based on a predetermined coding rate, and modulates this based on a predetermined modulation scheme. The user terminal generates a UCI sequence of M-NRS samples by controlling at least one of the coding process, the modulation process and rate matching (repetition, puncturing or insertion of a specific sequence (zero sequence)) based on the DFT size (M) and the number of bits of known information ($N_{bits}$). The user terminal applies S/P conversion to the transmission sequence of M samples, and inputs the result to a DFT (see FIG. 4A).

Thus, according to the second example of generation, in the first time domain before a DFT, known information is inserted, as RSs, in UCI before coding and modulation. Therefore, RS sequences can be generated using the same method as the coding and modulation method for UCI, so that the design of the transmitter can be simplified.

As described above, according to the first example, UCI and RSs are multiplexed in the first time domain before entry to a DFT, so that the UCI and the RSs can be placed and transmitted on a single carrier. It then follows that UCI and RSs can be multiplexed in one symbol, even when UL control channels, which may be comprised of a minimum of one symbol, are used, while preventing the increase of PAPR.

Second Example

According to a second example of the present invention, a user terminal multiplexes UCI and RSs in a second time domain following an IDFT. To be more specific, the user terminal inserts zero sequences in a UCI sequence in the first time domain before entry to a DFT, and adds RS sequences in the UCI sequence in the second time domain after exit from an IDFT.

FIG. 7 are diagrams to show an example of a DFT-S-OFDM transmitter according to the second example. In the second example, as shown in FIG. 7A, zero sequences are inserted at predetermined locations in a UCI sequence before entry to a DFT, and a transmission sequence of M samples, including a UCI sequence and zero sequences, is input to a DFT.

As shown in FIG. 7B, in the transmission sequence before entry to a DFT a predetermined number (predetermined length, predetermined number of samples, etc.) (Z) of zero sequences are inserted at predetermined locations in a UCI sequence before serial/parallel (S/P) conversion, and M samples are generated.

The transmission sequence comprised of M samples, including UCI and zero sequences, is input to a DFT after S/P conversion, and converted from the time domain to the frequency domain. Outputs of the DFT are mapped to M subcarriers, subjected to an N-point IDFT, and converted from the frequency domain to the time domain. Note that information that is input to the IDFT but not used is configured to zero. Outputs of the IDFT is subjected to P/S conversion.

FIG. 7C shows the transmission sequence (UCI sequence and zero sequences inserted before the DFT) after exit from the IDFT and subjected to P/S conversion. RS sequences are added to predetermined locations (here, locations corresponding to where the zero sequences are inserted) in the transmission sequence, and the transmission sequence with additions of RS sequences is transmitted in one symbol.

Note that the user terminal may control guard intervals (GIs) depending on in which locations RS sequences are added (these are the locations where zero sequences were inserted prior to the DFT). For example, when an RS sequence is added to a location at the top or the end of the transmission sequence, a GI needs not be appended here. On the other hand, when RS sequences are added to locations in the middle of the transmission sequence or to locations that are distributed, GIs may be appended.

The receiving apparatus (for example, a radio base station) has only to remove the guard intervals, if appended, to de-multiplex the UCI and RSs, before performing a DFT of size N and an IDFT of size M. The receiving apparatus performs channel estimation using these RS sequences, demodulates UL control channels based on the result of channel estimation, and has UCI. Alternatively, as has been described with the first example, the receiving apparatus may detect UCI based on maximum likelihood detection (which may be also referred to as "correlation detection") without performing channel estimation.

Here, the RS sequences to be inserted in the UCI may be CAZAC sequences (for example, ZC sequences), may be sequence conforming to CAZAC sequences (see, for example, TS 36.211 table 5.5.1.2-1 and table 5.5.1.2-2), or may be known training sequences (known signal sequence). Also, these RS sequences may be referred to as "UWs (Unique Words)" and so on.

Also, information to represent RS sequences (for example, the amount of phase rotation of ZC sequences, information to represent the values set forth in the above-mentioned tables (row values, column values, etc.), numbers to specify known signal sequences, and so forth) may be reported by at least one of high layer signaling, broadcast information, and physical layer signaling.

Also, the number of zero sequences (Z) (the length, the number of samples, etc.) inserted in the first time domain and the number of the RS sequences ($N_{RS}$) (the length, the number of samples, etc.) added in the second time domain may be reported (configured) from the network (for example, the radio base station) by at least one of higher layer signaling, broadcast information, and physical layer signaling, or may be determined in advance.

Also, the number of zero sequence (Z) and the number of RS sequences ($N_{RS}$) may assume different values, and be reported as separate items of information. Alternatively, the number of zero sequence (Z) and the number of RS sequences ($N_{RS}$) may take the same value, and be reported as a common (single) information item.

The user terminal encodes the UCI based on a predetermined coding rate, modulates this based on a predetermined modulation scheme (for example, QPSK, 16QAM, etc.), and generates a UCI sequence. As shown in FIGS. 7A and 7B, it is preferable to insert zero sequences of Z samples in a UCI sequence of M-Z samples in order to input, into a DFT, a transmission sequence of M samples, which is equal to the size of DFT.

Therefore, the user terminal may generate a UCI sequence of M-Z samples by controlling at least one of the coding process, the modulation process and rate matching (repetition, puncturing or insertion of a specific sequence (zero sequence)) based on the DFT size (M) and the number of RS sequences ($N_{RS}$). For example, if the number of samples of the UCI sequence that has been encoded and modulated is larger than M-Z samples, this UCI sequence may be punctured, at least partially. Also, if the number of samples of the UCI sequence that has been encoded and modulated is less than M-Z, specific sequences (for example, zero sequences) may be inserted in the UCI sequence, or at least a part of the UCI sequence may be repeated.

These locations for inserting zero sequences in the UCI sequence before the DFT may be determined in advance, or may be specified by at least one of higher layer signaling, broadcast information and physical layer signaling. Alternatively, for example, a set of prospective inserting locations may be reported by higher layer signaling, and specific inserting locations in this prospective set may be specified by physical layer signaling.

Also, these inserting locations may be determined per DFT size (transmission bandwidth) M. To be more specific, a set of prospective inserting locations may be determined for each DFT size M, and specific inserting locations in this prospective set may be specified by at least one of higher layer signaling, broadcast information and physical layer signaling.

For example, in FIG. 7B, zero sequences are inserted continuously at the end of the UCI sequence before a DFT, but the locations to insert zero sequence are not limited to these locations. Zero sequences may be inserted at the top or in the middle of the UCI sequence, or may be inserted in a distributed manner. When inserting zero sequences in a distributed manner, the inserting locations may be indicated by a bitmap.

The locations for inserting RS sequences in the transmission signal after an IDFT may be determined in advance, or may be specified by at least one of higher layer signaling, broadcast information and physical layer signaling. The locations where these RS sequences are added may be completely the same as the above-described locations for inserting zero sequences, or may be included in these zero-sequence inserting locations.

According to the second example described above, zero sequences are inserted in a UCI sequence in the first time domain before entry to a DFT, and RS sequences are added in the second time domain after exit from the IDFT, so that UCI and RSs can be placed and transmitted on a single carrier. It then follows that, UCI and RSs can be multiplexed in one symbol, even when UL control channels, which may be comprised of a minimum of one symbol, are used, while preventing the increase of PAPR.

Further, according to the second example, the receiving apparatus (for example, radio base station) can de-multiplex the UCI and RSs before performing a DFT of size N and an IDFT of size M, so that RS sequences can be detected at earlier timing than in the first example.

Third Example

According to a third example of the present invention, a user terminal inserts an RS sequence in a UCI sequence as a guard interval (GI), in the second time domain after exit from an IDFT.

FIG. 8 are diagrams to show an example of a DFT-S-OFDM transmitter according to the third example. In the third example, as shown in FIG. 8A, UCI is encoded, modulated and S/P-converted. The UCI sequence of M samples after the S/P conversion is input to a DFT. Outputs of the DFT are mapped to M subcarriers, and subjected to an IDFT of N points. Here, N>M holds, and information that is input to the IDFT but not used is configured to zero.

Outputs of the IDFT are subjected to P/S conversion. An RS sequence is inserted as a guard interval (GI) in the transmission sequence after the P/S conversion.

FIG. 8B shows the UCI sequence before entry to a DFT and before S/P conversion. This UCI sequence of M samples is generated by encoding UCI based on a predetermined coding rate and modulating this based on a predetermined modulation scheme (for example, QPSK, 16QAM, etc.). The user terminal generates a UCI sequence of M samples by controlling at least one of the coding process, the modulation process and rate matching (repetition, puncturing or insertion of a specific sequence (zero sequence)) based on the DFT size (M).

FIG. 8C shows the UCI sequence after exit from an IDFT and after P/S conversion. As shown in FIG. 8C, in this UCI sequence of N points, RS sequences are inserted as GIs, at predetermined locations (here, the end of the UCI sequence), and a transmission sequence, in which RS sequences are inserted, is transmitted in one symbol.

The receiving apparatus (for example, a radio base station) has only to remove the guard intervals, to de-multiplex the UCI and RSs, before performing a DFT of size N and an IDFT of size M. The receiving apparatus performs channel estimation using these RS sequences, demodulates UL control channels based on the result of channel estimation, and has UCI. Alternatively, as has been described with the first example, the receiving apparatus may detect UCI based on maximum likelihood detection (which may be also referred to as "correlation detection") without performing channel estimation.

Here, the RS sequences to be inserted in the UCI may be CAZAC sequences (for example, ZC sequences), may be sequence conforming to CAZAC sequences (see, for example, TS 36.211 table 5.5.1.2-1 and table 5.5.1.2-2), or may be known training sequences (known signal sequence). Also, these RS sequences may be referred to as "UWs (Unique Words)" and so on.

Also, information to represent RS sequences (for example, the amount of phase rotation of ZC sequences, information to represent the values set forth in the above-mentioned tables (row values, column values, etc.), numbers to specify known signal sequences, and so forth) may be reported by at least one of high layer signaling, broadcast information, and physical layer signaling.

Also, the length of GIs (that is, the number of RS sequences (RS length)) may be assumed to be the same as the length of cyclic prefixes (CPs) configured in the user terminal (for example, the length of normal CPs or the length of enhanced CPs), or may be reported (configured) from the network (for example, radio base station) by at least one of higher layer signaling, broadcast information, and physical layer signaling. When the GI length is reported from the network, a GI length (RS length) that is different from the CP length can be used.

Whether or not the user terminal inserts RS sequences as GIs in the second time domain may be changed depending what class the user terminal is classified into. In this case, the user terminal reports its class (UE class) to the network (for example, the radio base station) when gaining initial access. The user terminal may report the class as the user terminal's capability information (UE capability).

For example, UE class 1 may support insertion of RS sequences as GIs in addition to insertion of CPs. Meanwhile, UE class 2 supports insertion of CPs, but does not support insertion of RS sequences as GIs.

The network (for example, the radio base station) may transmit command information to command whether or not to insert RS sequences as GIs, to the user terminal, based on the UE class reported from the user terminal. For example, if above UE class 1 is reported from the user terminal the network may transmit the above command information to the user terminal. Also, this configuration information may be transmitted by using at least one of higher layer signaling, broadcast information and physical layer signaling.

Alternatively, the user terminal may decide whether or not to insert RS sequences as GIs based on the format of the UL control channel (for example, the number of symbols allocated to the UL control channel and/or the PUCCH format).

For example, when a predetermined number of symbols (for example, one symbol) or fewer symbols are allocated to the UL control channel, the user terminal may decide inserting RS sequences as GIs. On the other hand, when more than the predetermined number of symbols (for example, one symbol) are allocated to the UL control channel, the user terminal may decide to insert CPs instead of RS sequences. Note that, when CPs are inserted, specific symbols among a plurality of symbols allocated to the UL control channel may be made RS-only symbols.

According to the third example described above, RS sequences are inserted as GIs in the second time domain after exit from an IDFT, so that UCI and RSs can be placed and transmitted on a single carrier. It then follows that UCI and RSs can be multiplexed in one symbol, even when UL control channels, which may be comprised of a minimum of one symbol, are used, while preventing the increase of PAPR.

Furthermore, according to the third example, the receiving apparatus (for example, radio base station) can de-multiplex the UCI and RSs before performing a DFT of size N and an IDFT of size M, so that RS sequences can be detected at earlier timing than in the first example. Also, since the entry to M-point DFT on the transmitting side can be made the same as heretofore, so that a simpler design than the second example can be used.

<Variations>

Next, variations of the first to third examples will be described below. Although the first to third examples have shown DFT-S-OFDM transmitters as examples of single carrier (SC) transmitters, but the single carrier (SC) transmitters that are applicable to the present embodiment are not limited to the ones described above.

Figure 9A:
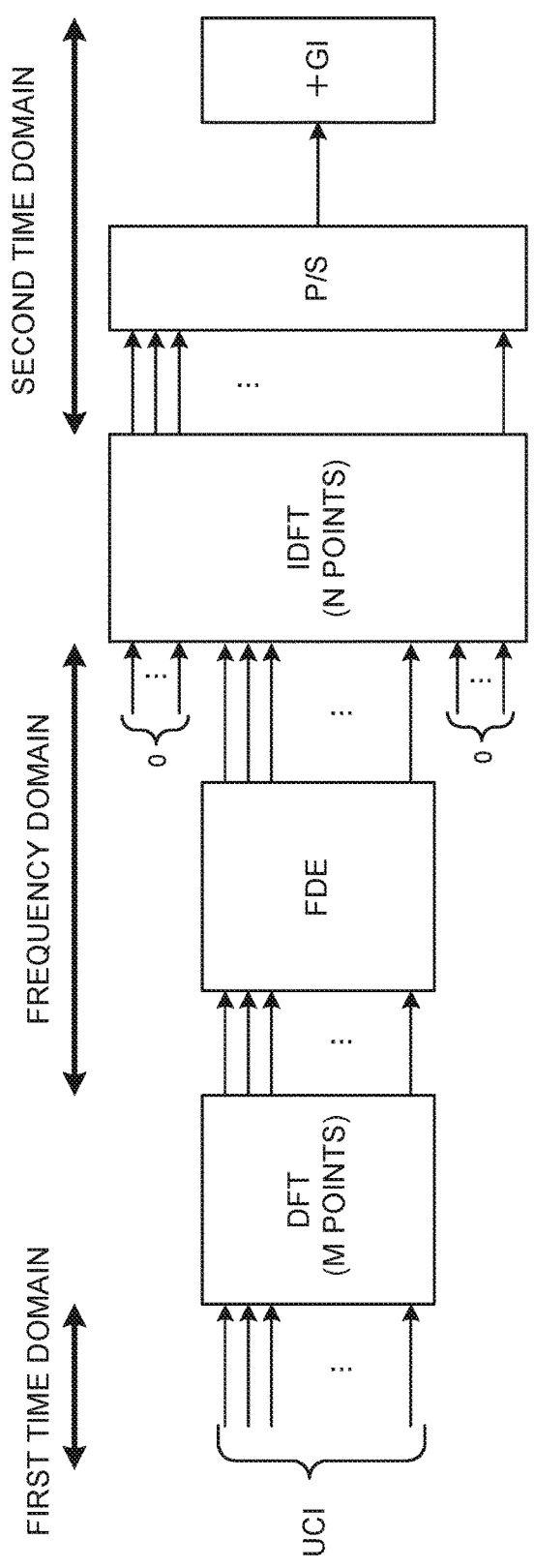
FIGS. 9A and 9B are diagrams to show examples of SC transmitters according to variations of the first to third examples of the present embodiment.

FIG. 9 are diagrams to show examples of variations of the SC transmitters according to the first to third examples. FIG. 9A shows an example of an SC transmitter that performs frequency domain equalization (FDE). Here, FDE refers to an equalization process for compensating for the frequency selectivity of radio channels, and may include, for example, techniques such as zero-forcing (ZF) equalization, minimum mean square error (MMSE) equalization and so forth.

As explained with the first example, the SC transmitter shown in FIG. 9A, may insert RS sequences (not shown in FIG. 9A) in a UCI sequence in the first time domain before a DFT.

Alternatively, as explained with the second example, the SC transmitter shown in FIG. 9A may insert zero sequences (not shown in FIG. 9A) in a UCI sequence in the first time domain before entry to a DFT, or may add RS sequences (not shown in FIG. 9A) to a UCI sequence in the second time domain after exit from an IDFT.

Alternatively, as explained with the third example, the SC transmitter shown in FIG. 9A may insert RS sequences (not shown in FIG. 9A) as GIs in a UCI sequence in the second time domain after exit from an IDFT.

Figure 9B:
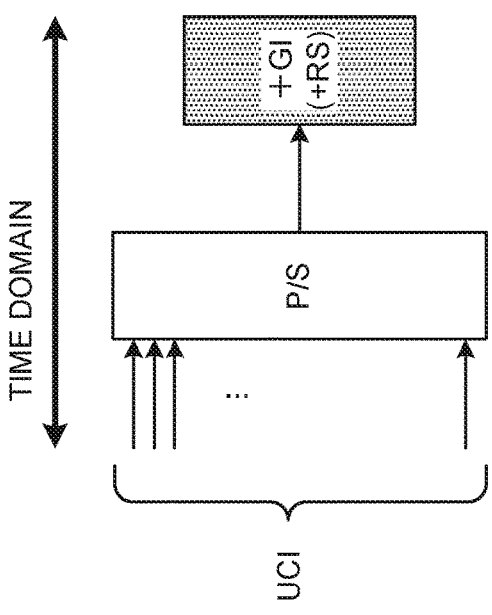

FIG. 9B shows a simple SC transmitter that does not perform a DFT and an IDFT on UCI that has been encoded and modulated. As explained with the third example, the SC transmitter shown in FIG. 9B may insert RS sequences in a UCI sequence as GIs, in the time domain.

Note that the DFT in FIG. 4 and FIG. 7 to FIG. 9 may be a fast Fourier transform (FFT). Also, the IDFT in FIG. 4 and FIG. 7 to FIG. 9 may be an inverse fast Fourier transform (IFFT).

In addition, in FIG. 4 and FIG. 7 to FIG. 9, DFT outputs are mapped to IDFT inputs in a continuous manner (also referred to as "localized DFT-S-OFDM" and so forth), but DFT outputs may be mapped to IDFT inputs at regular intervals (also referred to as "distributed DFT-S-OFDM" and so forth).

(Multi-Carrier Communication) Next, multi-carrier communication will be described. The third example of single carrier communication described above can also be applied to multi-carrier (MC) communication devices such as OFDM transmitters. Note that, below, differences from the third example will be primarily described.

Figure 10:
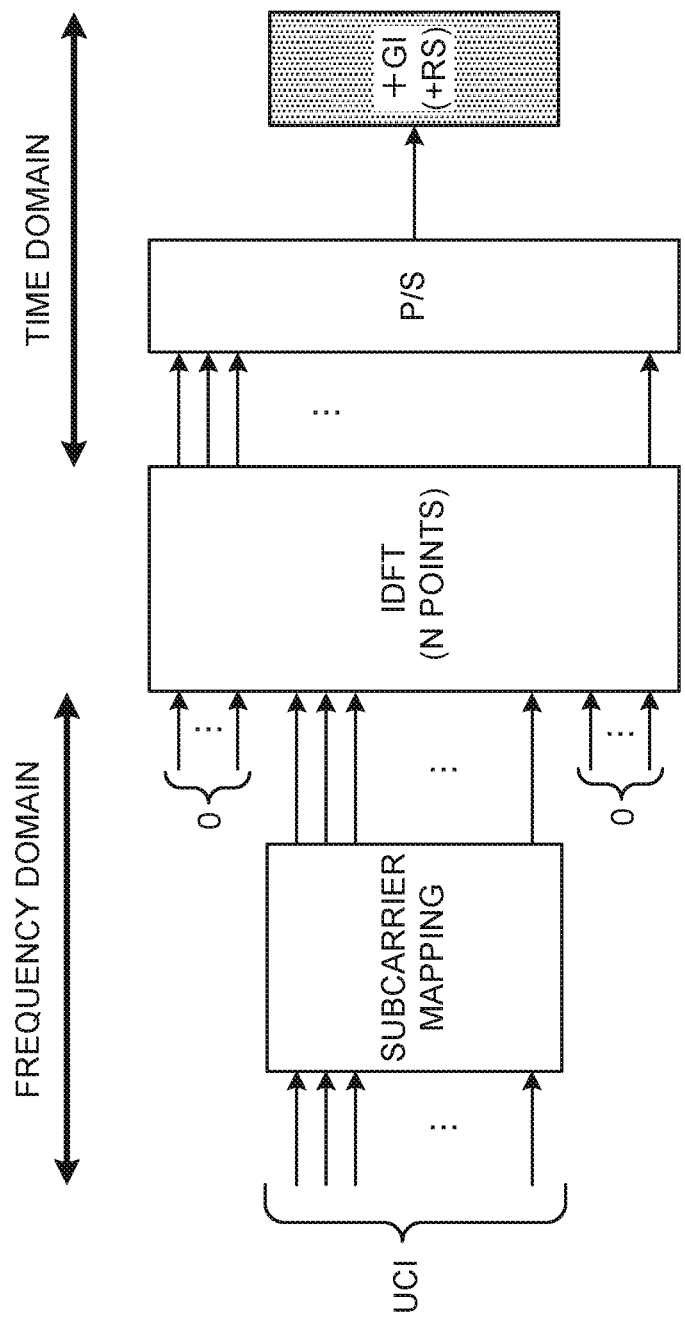
FIG. 10 is a diagram to show an example of an OFDM transmitter according to a variation of the third example of the present embodiment.

FIG. 10 is a diagram to show an example of a variation of the OFDM transmitter according to the third example. As shown in FIG. 10, with this OFDM transmitter, a UCI sequence that has been encoded and modulated is mapped to a number of subcarriers equal to the transmission bandwidth, and subjected to an IDFT (or an IFFT). Information that is input to the IDFT but not used is configured to zero.

Outputs of the IDFT are subject to P/S conversion, and RS sequences may be inserted as GIs at predetermined locations in the UCI sequence of N points (here, at the end of the UCI sequence). Here, the RS sequences may be CAZAC sequences (for example, ZC sequences), may be sequence conforming to CAZAC sequences (see, for example, TS 36.211 table 5.5.1.2-1 and table 5.5.1.2-2), or may be known training sequences (known signal sequence). Also, these RS sequences may be referred to as "UWs (Unique Words)" and so on.

The receiving apparatus (for example, a radio base station) has only to remove the guard intervals, to de-multiplex the UCI and RSs, before performing a DFT (or FFT) of size N. The receiving apparatus performs channel estimation using these RS sequences, demodulates UL control channels based on the result of channel estimation, and has UCI. Alternatively, as has been described with the first example, the receiving apparatus may detect UCI based on maximum likelihood detection (which may be also referred to as "correlation detection") without performing channel estimation.

As described above, even when multi-carrier communication such as OFDM (also referred to as "CP-OFDM" and so on) is carried out in the UL, the user terminal may multiplex and transmit UCI and RSs in the time domain, within one symbol, by inserting RS sequences as GIs.

Note that, when multi-carrier communication is carried out, even if UCI and RSs are frequency-division-multiplexed upon different subcarriers in one symbol, the PAPR is not a problem, unlike the case where single carrier communication is performed. It then follows that, when multi-carrier communication is performed, as described in FIG. 2A, UCI and RSs can be frequency-division-multiplexed in one symbol.

<Subframe Structures>

Next, subframe structures according to the present embodiment will be described below. FIG. 11 are diagrams to show examples of subframe structures according to the present embodiment. Note that the subframe structures shown in FIGS. 11A to 11D are simply examples, the subframe structures that are applicable to the present embodiment are by no means limited to these.

Figure 11A:
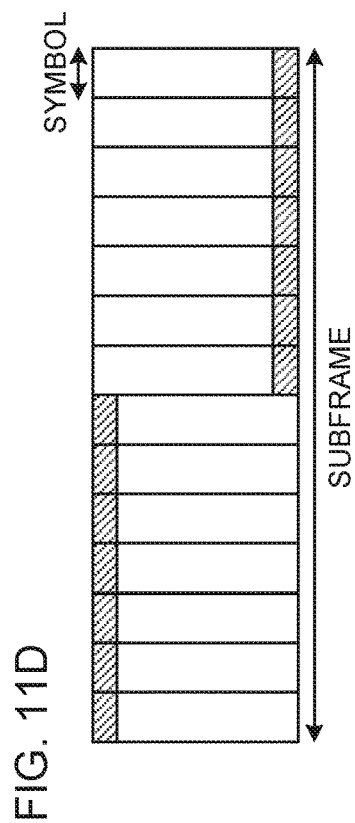
FIGS. 11A to 11F are diagrams to show examples of subframe structures according to the present embodiment.

FIG. 11A shows a UL control channel constituted by one symbol (here, the last symbol) in a subframe. In the event single-carrier communication is used, UCI and RSs to be transmitted in this UL control channel may be multiplexed in this one symbol based on at least one of the above-described first to third examples and variations thereof. In the event multi-carrier communication is used, UCI and RSs may be frequency-division-multiplexed on different subcarriers, or UCI and RSs to be transmitted in this UL control channel may be, based on the third example, multiplexed in this one symbol.

Figure 11B:
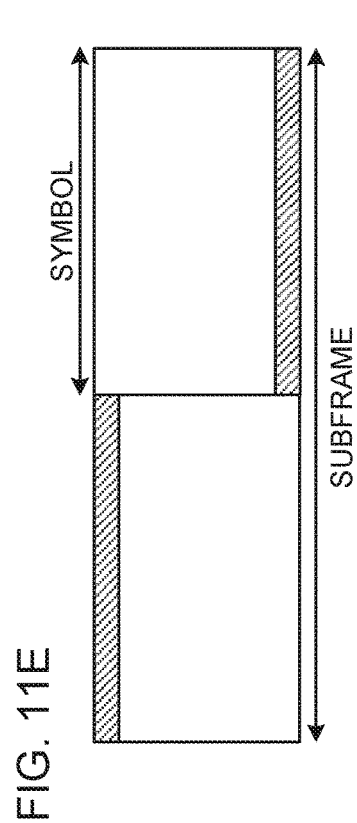

FIG. 11B shows a UL control channel, which is constituted by a plurality of symbols (here, the last two symbols) in a subframe, and to which frequency hopping is not applied. In the event single-carrier communication is used, UCI and RSs to be transmitted in this UL control channel may be multiplexed in at least one symbol based on at least one of the above-described first to third examples and variations thereof. Alternatively, it may be possible to transmit RSs in one symbol and transmit UCI in the other symbol, although the overhead might increase. In the event multi-carrier communication is used, UCI and RSs may be frequency-division-multiplexed, or the third example may be applied.

Figure 11C:
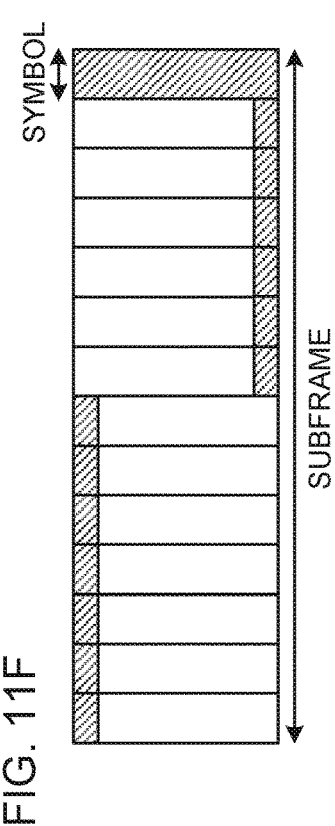

FIG. 11C shows a UL control channel, which is constituted by multiple symbols (here, the last two symbols) in a subframe, and to which frequency hopping is not applied. When frequency hopping is applied, RSs are required for every frequency band in which the UL control channel is transmitted. It then follows that, when single-carrier communication is used, UCI and RSs to be transmitted in this UL control channel may be multiplexed on a per symbol basis, based on at least one of the above-described first to third examples and variations thereof. In the event multi-carrier communication is used, UCI and RSs may be frequency-division-multiplexed, or the third example may be applied.

Figure 11D:
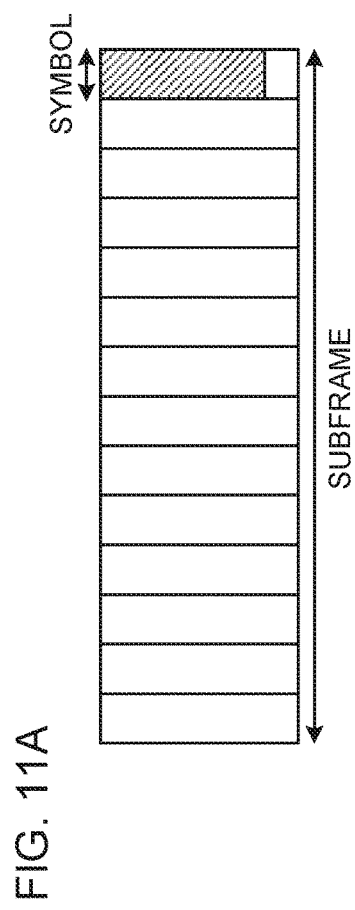

FIG. 11D shows a UL control channel constituted by all the symbols in a subframe. In the event single carrier communication is used, specific symbols may be used as RS-only symbols as in existing PUSCH formats 1 to 5, UCI and RSs to be transmitted in this UL control channel may be multiplexed in at least one symbol based on at least one of the above-described first to third examples and variations thereof. In the event multi-carrier communication is used, UCI and RSs may be frequency-division-multiplexed in specific symbols, or the third example may be applied.

Figure 11E:
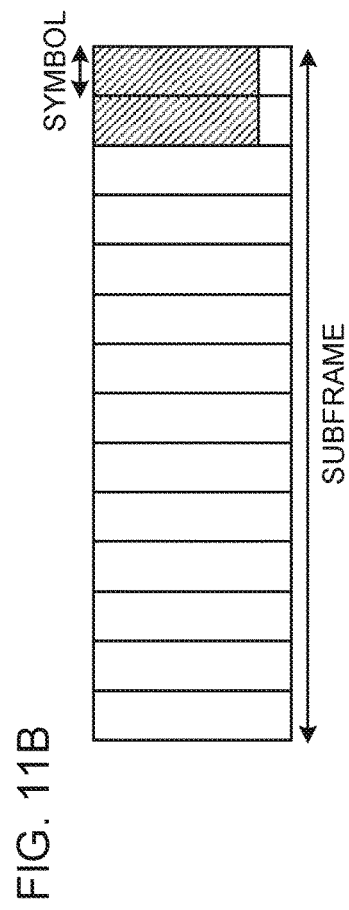

FIG. 11E shows a UL control channel, which is constituted by two symbols in a subframe, and to which frequency hopping is applied. In the event single-carrier communication is used, UCI and RSs to be transmitted in this UL control channel may be multiplexed on a per symbol basis, based on at least one of the above-described first to third examples and variations thereof. In the event multi-carrier communication is used, UCI and RSs may be frequency-division-multiplexed, or the third example may be applied.

Figure 11F:
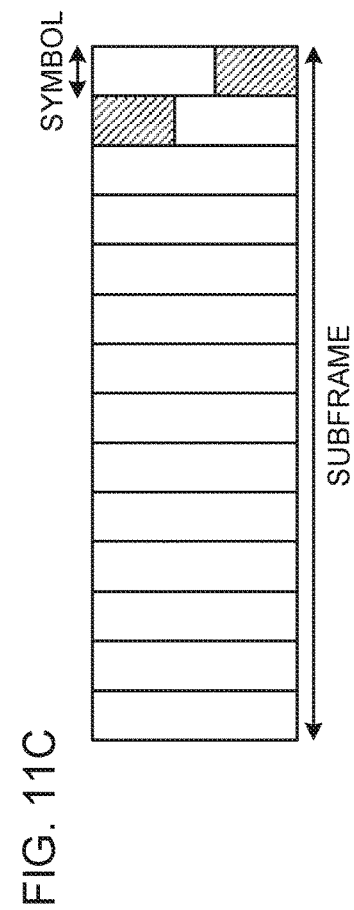

FIG. 11F shows a case where a UL control channel of the first format, which is constituted by one symbol in the subframe, and a UL control channel of a second format, where frequency hopping is applied to all the symbols that are available in the subframe are provided at the same time. When using the UL control channel of the first format, the same multiplexing method as in FIG. 11A can be used. When using the UL control channel in the second format, the same multiplexing method as in FIG. 11D can be used.

(Radio Communication System)

Now, the structure of a radio communication system according to the present embodiment will be described below. In this radio communication system, each radio communication method according to the above-described embodiments is employed. The radio communication methods according to individual embodiments may be applied alone or may be applied in combination.

Figure 12:
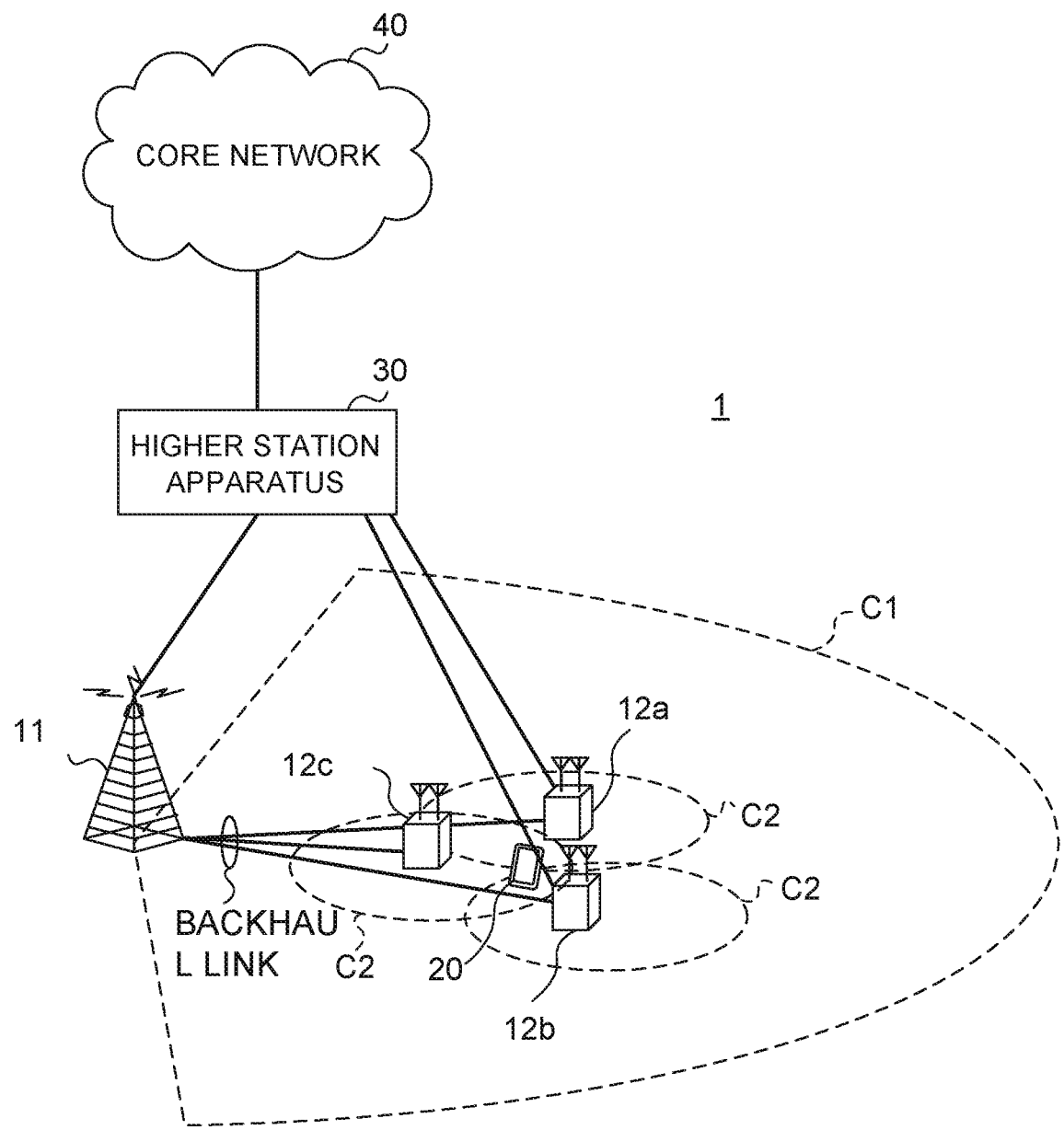
FIG. 12 is a diagram to show an exemplary schematic structure of a radio communication system according to the present embodiment.

FIG. 12 is a diagram to show an exemplary schematic structure of a radio communication system according to the present embodiment. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit. Note that the radio communication system 1 may be also referred to as "SUPER 3G," "LTE-A (LTE-Advanced)," "IMT-Advanced," "4G," "5G," "FRA (Future Radio Access)," "NR (New RAT (New Radio Access Technology))," and so on.

The radio communication system 1 shown in FIG. 12 includes a radio base station 11 that forms a macro cell C1, and radio base stations 12a to 12c that are placed within the macro cell C1 and that form small cells C2, which are narrower than the macro cell C1. Also, user terminals 20 are placed in the macro cell C1 and in each small cell C2. A structure in which different numerologies are applied between cells and/or within cells may be adopted.

The user terminals 20 can connect with both the radio base station 11 and the radio base stations 12. The user terminals 20 may use the macro cell C1 and the small cells C2 at the same time by means of CA or DC. Also, the user terminals 20 can execute CA or DC by using a number of cells (CCs) (for example, two or more CCs). Furthermore, the user terminals 20 can use licensed-band CCs and unlicensed-band CCs as a number of cells.

Furthermore, the user terminal 20 can communicate by using time division duplexing (TDD) or frequency division duplexing (FDD) in each cell. A TDD cell and an FDD cell may be referred to as a "TDD carrier (frame structure type 2)," and an "FDD carrier (frame structure type 1)," respectively.

Furthermore, in each cell (carrier), a single numerology may be employed, or a number of different numerologies may be employed.

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals or stationary communication terminals. Furthermore, the user terminals 20 can perform device-to-device (D2D) communication with other user terminals 20.

In the radio communication system 1, as radio access schemes, OFDMA (Orthogonal Frequency Division Multiple Access) can be applied to the downlink (DL), and SC-FDMA (Single-Carrier Frequency Division Multiple Access) can be applied to the uplink (UL). OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to the combination of these, and OFDMA may be used in UL.

In the radio communication system 1, a downlink shared channel (PDSCH (Physical Downlink Shared CHannel)), which is shared by each user terminal 20, a broadcast channel (PBCH (Physical Broadcast CHannel)), L1/L2 control channels and so on are used as downlink channels. User data, higher layer control information and SIBs (System Information Blocks) are communicated in the PDSCH. Also, the MIB (Master Information Block) is communicated in the PBCH.

The L1/L2 control channels include a DL control channel (a PDCCH (Physical Downlink Control CHannel), an EPDCCH (Enhanced Physical Downlink Control CHannel)), a PCFICH (Physical Control Format Indicator CHannel), a PHICH (Physical Hybrid-ARQ Indicator CHannel) and so on. Downlink control information (DCI), including PDSCH and PUSCH scheduling information, and so on is communicated by the PDCCH. The number of OFDM symbols to use for the PDCCH is communicated by the PCFICH. The EPDCCH is frequency-division-multiplexed with the PDSCH and used to communicate DCI and so on, like the PDCCH. HARQ retransmission command information (ACK/NACK) in response to the PUSCH can be communicated using at least one of the PHICH, the PDCCH and the EPDCCH.

In the radio communication system 1, a UL shared channel (PUSCH (Physical Uplink Shared CHannel)), which is shared by each user terminal 20, an uplink control channel (PUCCH (Physical Uplink Control CHannel)), a random access channel (PRACH (Physical Random Access CHannel)) and so on are used as UL channels. User data, higher layer control information and so on are communicated by the PUSCH. Uplink control information (UCI), including at least one of DL signal retransmission control information (A/N), channel state information (CSI) and so on, is communicated in the PUSCH or the PUCCH. By means of the PRACH, random access preambles for establishing connections with cells are communicated.

(Radio Base Station)

Figure 13:
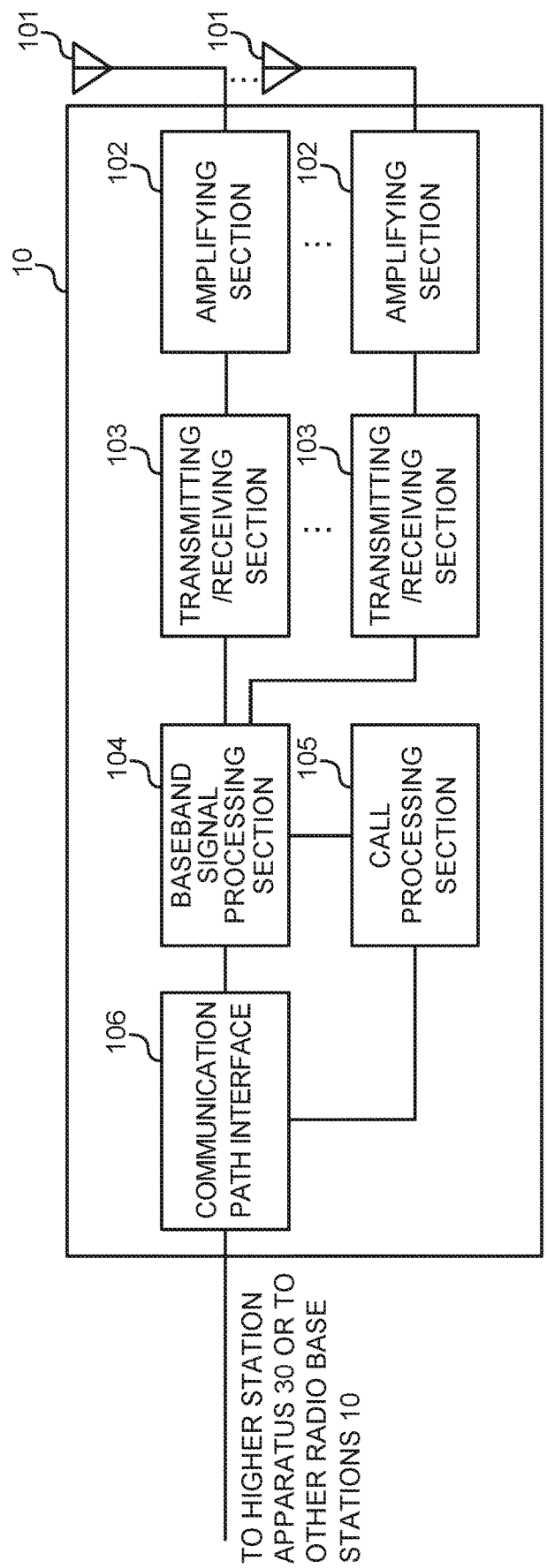
FIG. 13 is a diagram to show an exemplary overall structure of a radio base station according to the present embodiment.

FIG. 13 is a diagram to show an exemplary overall structure of a radio base station according to the present embodiment. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided. The radio base station 10 can constitute the receiving apparatus of the present invention in the UL and the transmission apparatus of the present invention in the DL.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to transmission processes, including a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) (or an inverse discrete Fourier transform (IDFT)) process and a precoding process, and the result is forwarded to the transmitting/receiving sections 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101.

A transmitting/receiving section 203 can be constituted by a transmitters/receiver, a transmitting/receiving circuit or transmitting/receiving apparatus that can be described based on general understanding of the technical field to which the present invention pertains. Note that a transmitting/receiving section 103 may be structured as a transmitting/receiving section in one entity, or may be constituted by a transmitting section and a receiving section.

Meanwhile, as for UL signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, UL data contained in the input UL signal is subjected to a fast Fourier transform (FFT) (or a discrete Fourier transform (DFT) process), an inverse discrete Fourier transform (IDFT) (or an inverse fast Fourier transform (IFFT)) process, error correction decoding, a receiving process based on MAC retransmission control, and RLC layer and PDCP layer receiving processes, and the result is forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals (backhaul signaling) with neighboring radio base stations 10 via an inter-base station interface (which is, for example, optical fiber that is in compliance with the CPRI (Common Public Radio Interface), the X2 interface, and so forth).

In addition, the transmitting/receiving sections 103 transmit DL signals (including at least one of DL data signals, DL control signals and DL reference signals) to a number of user terminals 20 that use different numerologies, and receive UL signals (including at least one of UL data signals, UL control signals and UL reference signals) from these user terminals 20.

In addition, the transmitting/receiving sections 103 receive UCI from the user terminals 20 through a UL data channel (for example, PUSCH) or a UL control channel (for example, PUCCH). This UCI contains at least one of HARQ-ACK in response to the DL data channel (for example, PDSCH), CSI, and SR.

In addition, the transmitting/receiving sections 103 may transmit information that shows at least one of RS sequences, the number of RS sequences ($N_{RS}$), the number of zero sequences (Z), the locations where RS sequences are inserted (or added), and the locations where zero sequences are inserted.

Figure 14:
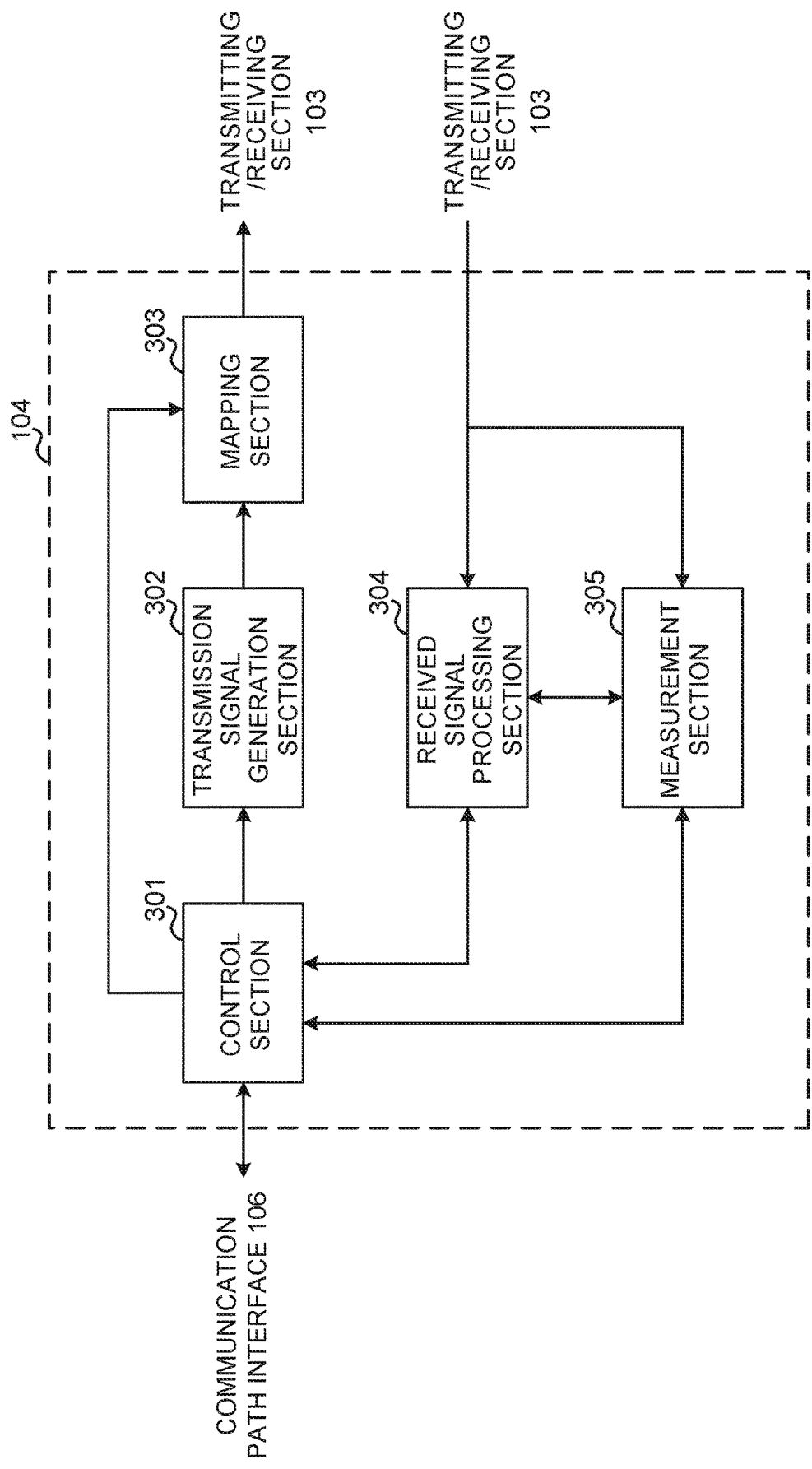
FIG. 14 is a diagram to show an exemplary functional structure of a radio base station according to the present embodiment.

FIG. 14 is a diagram to show an exemplary functional structure of a radio base station according to the present embodiment. Note that, although FIG. 14 primarily shows functional blocks that pertain to characteristic parts of the present embodiment, the radio base station 10 has other functional blocks that are necessary for radio communication as well. As shown in FIG. 14, the baseband signal processing section 104 has a control section 301, a transmission signal generation section 302, a mapping section 303, a received signal processing section 304 and a measurement section 305.

The control section 301 controls the whole of the radio base station 10. The control section 301 controls, for example, generation of DL signals in the transmission signal generation section 302, mapping of DL signals in the mapping section 303, UL signal receiving processes (including, for example, demodulation) in the received signal processing section 304 and measurements in the measurement section 305.

The control section 301 schedules user terminals 20. To be more specific, the control section 301 may perform scheduling and/or retransmission control with respect to DL data channels and/or UL data channels based on UCI from the user terminals 20.

In addition, the control section 301 may exert control so that a UL control channel structure that is used to transmit UCI from the user terminals 20 is selected from a number of UL control channel structures, and specifying information that designates the selected UL control channel structure is transmitted. These UL control channel formats may include the UL control channel formats described in the first to third examples above, existing PUCCH formats 1 to 5 and/or others.

Also, the control section 301 may control the receipt of UCI using a UL control channel. To be more specific, the control section 301 may control the received signal processing section 304 and the measurement section 305 to detect reference signals that are multiplexed with UCI in the time domain in one symbol, demodulate the UL control channel based on these reference signals, and decode the UCI.

For example, control section 301 may control the received signal processing section 304 to de-multiplex the UCI and RSs by removing guard intervals, performing a DFT (FFT) of size N, and performing an IDFT (IFFT) of size M (first example). Also, the control section 301 may control the received signal processing section 304 to de-multiplex the UCI and RSs before performing a DFT of size N (FFT) and an IDFT of size M (IFFT) (second and third examples).

Also, the control section 301 may control the transmission of DCI using a DL control channel. To be more specific, the control section 301 may control the transmission signal generation section 302 to multiplex and transmit DCI and RSs in the time domain in one symbol.

For example, the control section 301 may control the transmission signal generation section 302 to multiplex DCI and RSs in the first time domain before DFT (FFT) (first example). To be more specific, the control section 301 may control the transmission signal generation section 302 to insert RSs at predetermined locations in a DCI sequence that has been encoded and/or modulated (first example of generation). Alternatively, the control section 301 may control the transmission signal generation section 302 to insert RSs at predetermined locations in DCI before coding and modulation (second example of generation).

Also, the control section 301 may control the transmission signal generation section 302 to insert zero sequences in a DCI sequence in the first time domain before a DFT (FFT), and add RSs to predetermined locations in the transmission sequence containing the DCI sequence and zero sequences, in the second time domain after an IDFT (IFFT) (second example).

Also, the control section 301 may control the transmission signal generation section 302 to insert RSs as guard intervals in the second time domain after an IDFT (IFFT) (third example).

The control section 301 can be constituted by a controller, a control circuit or control apparatus that can be described based on general understanding of the technical field to which the present invention pertains. Note that, according to the present invention, the multiplexing section that multiplexes DCI and RSs in the time domain in one symbol is constituted by the control section 301 and the transmission signal generation section 302. Furthermore, according to the present invention, the de-multiplexing section to de-multiplex the RSs multiplexed with UCI in the time domain in one symbol is constituted by the control section 301 and the received signal processing section 304.

The transmission signal generation section 302 generates DL signals (including DL data signals, DL control signals, DL reference signals and so on) based on commands from the control section 301, and outputs these signals to the mapping section 303.

The transmission signal generation section 302 may be a DFT-S-OFDM transmitter (see FIG. 3 to FIG. 8), another SC transmitter (see FIG. 9), an OFDM transmitter (see FIG. 10), or any signal generator, signal generating circuit or signal generation apparatus that can be described based on general understanding of the technical field to which the present invention pertains.

The mapping section 303 maps the DL signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding, and so forth) for UL signals transmitted from the user terminals 20 (including, for example, UL data signals, UL control signals, UL reference signals, and so forth). To be more specific, the received signal processing section 304 demodulates and decodes the UL signals (for example, UL control channel) based on the result of channel estimation in the measurement section 305. Alternatively, the received signal processing section 304 may detect (demodulate, decode, etc.) UL signals using maximum likelihood detection (which may also be referred to as "correlation detection").

The received signal processing section 304 may be a DFT-S-OFDM receiver, another SC receiver, an OFDM receiver, or any receiving processor (modulator, encoder, etc.) or receiving process apparatus that can be described based on general understanding of the technical field to which the present invention pertains.

The measurement section 305 performs channel estimation based on reference signals (for example, DM-RS). The measurement section 305 may also measure channel states (sounding) based on reference signals (for example, SRS). The measurement section 305 can be constituted by a measurer, a measurement circuit or measurement apparatus that can be described based on general understanding of the technical field to which the present invention pertains.

(User Terminal)

Figure 15:
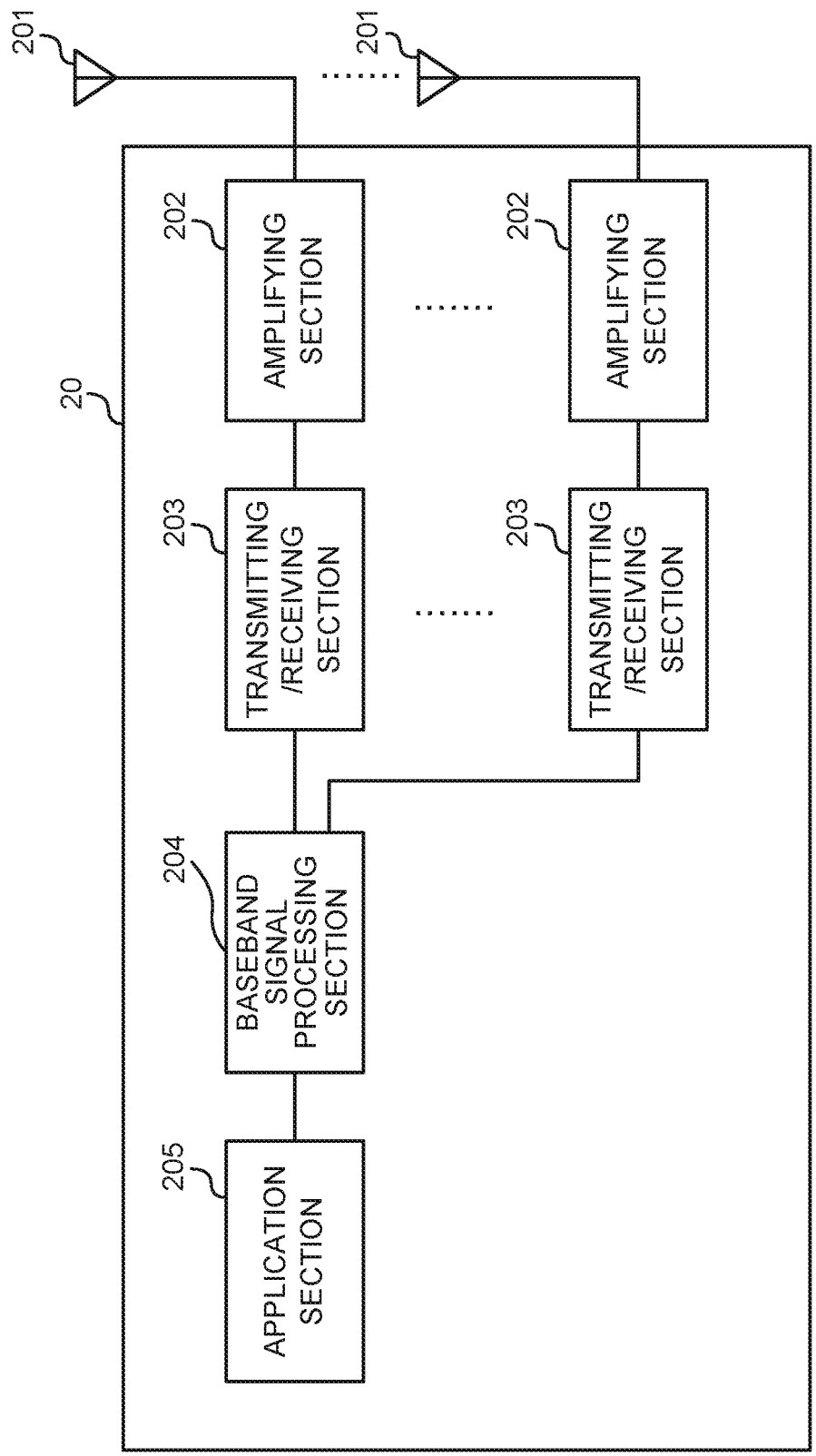
FIG. 15 is a diagram to show an exemplary overall structure of a user terminal according to the present embodiment.

FIG. 15 is a diagram to show an exemplary overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. The user terminal 20 can constitute the transmission apparatus of the present invention in the UL and the receiving apparatus of the present invention in the DL.

Radio frequency signals that are received in the transmitting/receiving antennas 201 are amplified in the amplifying sections 202. The transmitting/receiving sections 203 receive the DL signals amplified in the amplifying sections 202. The received signals are subjected to frequency conversion and converted into the baseband signal in the transmitting/receiving sections 203, and output to the baseband signal processing section 204.

The baseband signal processing section 204 performs, for the baseband signal that is input, FFT (DFT) process, error correction decoding, a retransmission control receiving process and so on. The DL data is forwarded to the application section 205. The application section 205 performs processes related to higher layers above the physical layer and the MAC layer, and so on. Also, the broadcast information is also forwarded to application section 205.

Meanwhile, UL data is input from the application section 205 to the baseband signal processing section 204. In the baseband signal processing section 204, transmission processes related to retransmission control (for example, HARQ transmission process), channel coding, rate matching, puncturing, a DFT (or FFT) process, an IFFT (or IDFT) process, and so on are performed, and the result is forwarded to each transmitting/receiving section 203. UCI is also subjected to at least one of channel coding, rate matching, puncturing, DFT (or FFT) process and IFFT (or IDFT) process, and forwarded to each transmitting/receiving section 203.

Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

Furthermore, the transmitting/receiving sections 203 receive DL signals (including DL data signals, DL control signals, DL reference signals and so forth) of the numerology configured in the user terminal 20, and transmit UL signals (including a UL data signal, a UL control signal, a UL reference signal, and so forth) based on this numerology.

In addition, the transmitting/receiving sections 203 transmit UCI to the radio base station 10 through a UL data channel (for example, PUSCH) or a UL control channel (for example, PUCCH). In addition, the transmitting/receiving sections 203 may receive information showing at least one of RS sequences, the number of RS sequences ($N_{RS}$), the number of zero sequences (Z), the locations where RS sequences are inserted (or added) and the locations where zero sequences are inserted.

The transmitting/receiving sections 203 can be constituted by transmitters/receivers, transmitting/receiving circuits or transmitting/receiving apparatus that can be described based on general understanding of the technical field to which the present invention pertains. Furthermore, a transmitting/receiving section 203 may be structured as one transmitting/receiving section, or may be formed with a transmitting section and a receiving section.

Figure 16:
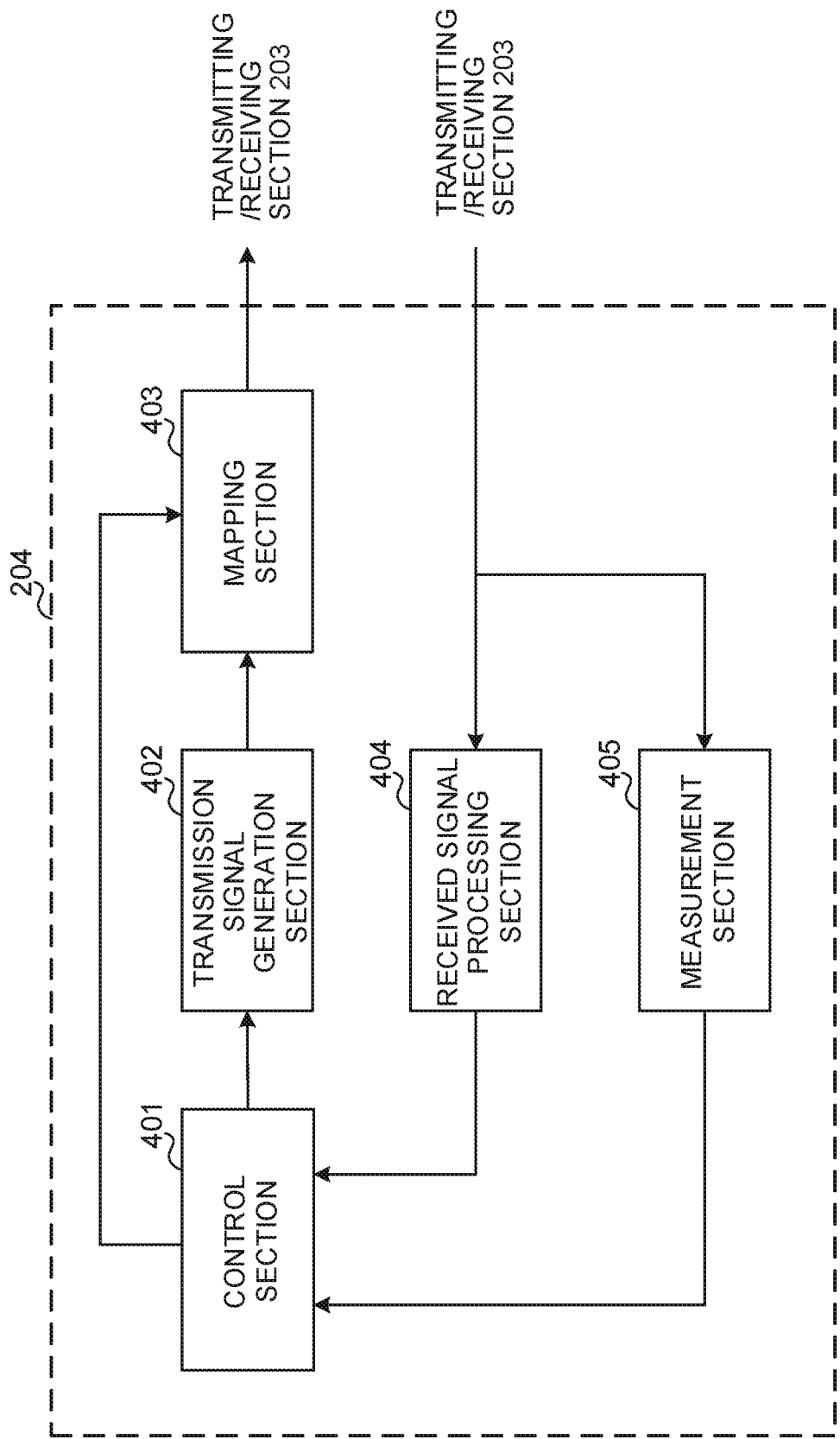
FIG. 16 is a diagram to show an exemplary functional structure of a user terminal according to the present embodiment.

FIG. 16 is a diagram to show an exemplary functional structure of a user terminal according to the present embodiment. Note that, although FIG. 16 primarily shows functional blocks that pertain to characteristic parts of the present embodiment, but a user terminal 20 may have other functional blocks that are necessary for radio communication as well. As shown in FIG. 16, the baseband signal processing section 204 provided in the user terminal 20 has a control section 401, a transmission signal generation section 402, a mapping section 403, a received signal processing section 404 and a measurement section 405.

The control section 401 controls the whole of the user terminal 20. The control section 401 controls, for example, the generation of UL signals in the transmission signal generation section 402, the mapping of UL signals in the mapping section 403, the DL signal receiving processes in the received signal processing section 404, the measurements in the measurement section 405 and so on.

In addition, the control section 401 selects the UL control channel structure to use to transmit UCI from the user terminal 20, from among a number of UL control channel structures. For example, the control section 401 may select the UL control channel structure based on specifying information from the radio base station 10. These UL control channel formats may include the UL control channel format described with the first to third examples above, existing PUCCH formats 1 to 5 and/or others.

Also, the control section 401 may control the transmission of UCI using a UL control channel. To be more specific, the control section 401 may control the transmission signal generation section 402 to multiplex and transmit UCI and RSs in the time domain in one symbol.

For example, the control section 401 may control the transmission signal generation section 402 to multiplex UCI and RSs in the first time domain before a DFT (FFT) (first example). To be more specific, the control section 401 may control the transmission signal generation section 402 to insert RSs at predetermined locations in a UCI sequence that has been encoded and/or modulated (first example of generation). Alternatively, the control section 401 may control the transmission signal generation section 402 to insert RSs at predetermined locations in UCI before coding and modulation (second example of generation).

Also, the control section 401 may control the transmission signal generation section 402 to insert zero sequences in a UCI sequence in the first time domain before a DFT (FFT), and add RSs to predetermined locations in the transmission sequence containing the UCI sequence and zero sequences, in the second time domain after an IDFT (IFFT) (second example).

Also, the control section 401 may control the transmission signal generation section 402 to insert RSs as guard intervals (GIs) in the second time domain after an IDFT (IFFT) (third example). Also, the control section 401 may decide whether or not to insert RSs as GIs based on command information from the radio base station 10. In addition, the control section 401 may decide whether or not to insert RSs as GIs based on the format of the UL control channel (for example, the number of symbols, the PUCCH format, etc.).

In addition, the control section 401 may control the receipt of DCI using a DL control channel. To be more specific, the control section 401 may control the received signal processing section 404 and the measurement section 405 to detect the reference signals multiplexed with DCI in the time domain in one symbol, demodulate the DL control channel based on these reference signals, and decode the DCI.

For example, the control section 401 may control the received signal processing section 404 to de-multiplex the DCI and RSs 1 by removing GIs, performing a DFT (FFT) of size N, and performing an IDFT (IFFT) of size M (first example). Also, the control section 401 may control the received signal processing section 404 to de-multiplex the UCI and RSs before performing a DFT (FFT) of size N and an IDFT (IFFT) of size M (second and third examples).

For the control section 401, a controller, a control circuit or control apparatus that can be described based on general understanding of the technical field to which the present invention pertains can be used. Note that, according to the present invention, the multiplexing section that multiplexes UCI and RSs in the time domain in one symbol is constituted by the control section 401 and the transmission signal generation section 402. Furthermore, in the present invention, the de-multiplexing section to de-multiplex the RSs multiplexed with UCI in the time domain in one symbol is constituted by the control section 401 and the received signal processing section 404.

In the transmission signal generation section 402, UL signals (which may be UL data signals, UL control signals, UL reference signals and so on, including UCI) are generated (including, for example, encoding, rate matching, puncturing, inserting specific sequences, modulation and so forth) based on commands from the control section 401, and output to the mapping section 403.

The transmission signal generation section 402 may be a DFT-S-OFDM transmitter (see FIG. 3 to FIG. 8), another SC transmitter (see FIG. 9), an OFDM transmitter (see FIG. 10), or any signal generator, signal generating circuit or signal generation apparatus that can be described based on general understanding of the technical field to which the present invention pertains.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding, and so forth) of DL signals (including DL data signals, scheduling information, DL control signals, DL reference signals, and so forth). The received signal processing section 404 outputs the information received from the radio base station 10, to the control section 401. The received signal processing section 404 outputs, for example, broadcast information, system information, high layer control information related to higher layer signaling such as RRC signaling, physical layer control information (L1/L2 control information) and so on, to the control section 401.

Also, the received signal processing section 404 may demodulate and decode DL signals (for example, DL control channel) based on the result of channel estimation in the measurement section 405. Alternatively, the received signal processing section 404 may detect (demodulate, decode, etc.) DL signals by using maximum likelihood detection (which may also be referred to as "correlation detection"), regardless of the result of channel estimation.

The received signal processing section 404 may be a DFT-S-OFDM receiver, another SC receiver, an OFDM receiver, or any receiving processor (modulator, encoder, etc.) or receiving process apparatus that can be described based on general understanding of the technical field to which the present invention pertains.

The measurement section 405 measures channel states based on reference signals (for example, CSI-RS) from the radio base station 10, and outputs the measurement results to the control section 401. Note that the channel state measurements may be conducted per CC.

The measurement section 405 performs channel estimation based on reference signals (for example, DM-RS). Also, the measurement section 405 may also measure channel states (sounding) based on reference signals (for example, SRS). The measurement section 405 can be constituted by a measurer, a measurement circuit or measurement apparatus that can be described based on general understanding of the technical field to which the present invention pertains.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these multiple pieces of apparatus.

Figure 17:
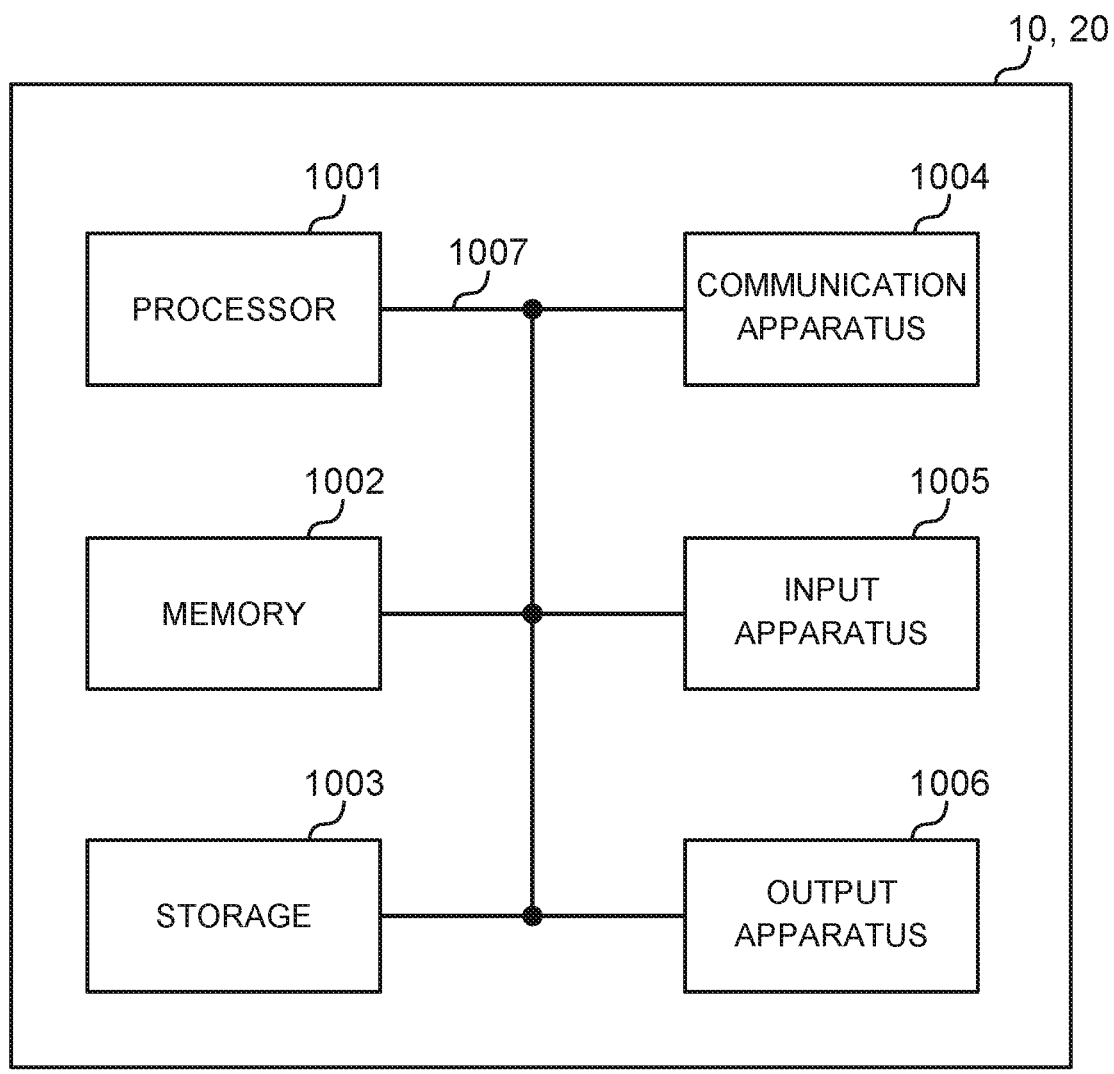
FIG. 17 is a diagram to show exemplary hardware structure of a radio base station and a user terminal according to the present embodiment.

For example, the radio base station, user terminals and so on according to one embodiment of the present invention may function as a computer that executes the processes of the radio communication method of the present invention. FIG. 17 is a diagram to show an exemplary hardware structure of a radio base station and a user terminal according to one embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented either simultaneously or in sequence, or in different manners, on two or more processors. Note that the processor 1001 may be implemented with one or more chips.

Each function of the radio base station 10 and user terminal 20 is implemented by reading predetermined software (programs) on hardware such as the processor 1001 and the memory 1002 and allowing the processor 1001 to do calculations, control the communication apparatus 1004 to communicate, and the memory 1002, the storage 1003 to read and/or write data, and so forth.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and so on for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, and so forth), a magnetic stripe, a database, a server, and/or other appropriate storage media. The storage 1003 may be referred to as "secondary storage apparatus."

The communication apparatus 1004 is hardware (transmitting/receiving apparatus) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and others, are connected by a bus 1007 for communicating information. The bus 1007 may be formed with a single bus, or may be formed with buses that vary between pieces of apparatus.

Also, the radio base station 10 and user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier (CC)" may be referred to as a "cell," a "frequency carrier," a "carrier frequency" and so on.

Furthermore, a radio frame may be comprised of one or more periods (frames) in the time domain. Each of one or more periods (frames) constituting a radio frame may be referred to as a "subframe." Furthermore, a subframe may be comprised of one or more slots in the time domain. Furthermore, a slot may be comprised of one or more symbols in the time domain (OFDM (Orthogonal Frequency Division Multiplexing) symbols, SC-FDMA (Single Carrier Frequency Division Multiple Access) symbols, and so on).

A radio frame, a subframe, a slot and a symbol all represent the time unit in signal communication. A radio frame, a subframe, a slot and a symbol may be each called by other applicable names. For example, one subframe may be referred to as a "transmission time interval (TTI)," or a plurality of consecutive subframes may be referred to as a "TTI," and one slot may be referred to as a "TTI." That is, a subframe and/or a TTI may be a subframe (1 ms) in existing LTE, may be a shorter period than 1 ms (for example, one to thirteen symbols), or may be a longer period than 1 ms. Note that the unit to represent a TTI may be referred to as a "slot," a "mini slot" and so on, instead of a "subframe."

Here, a TTI refers to the minimum time unit of scheduling in radio communication, for example. For example, in LTE systems, a radio base station schedules radio resources (such as the frequency bandwidth and transmission power that can be used in each user terminal) to allocate to each user terminal in TTI units. Note that the definition of TTIs is not limited to this. TTIs may be the time unit for transmitting channel-encoded data packets (transport blocks), or may be the unit of processing in scheduling, link adaptation and so on.

A TTI having a time duration of 1 ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," a "shortened subframe," a "short subframe," and so on.

A resource block (RB) is the unit of resource allocation in the time domain and the frequency domain, and may include one or a plurality of consecutive subcarriers in the frequency domain. Also, an RB may include one or more symbols in the time domain, and may be one slot, one subframe or one TTI in length. One TTI and one subframe each may be comprised of one or more resource blocks. Note that an RB may be referred to as a "physical resource block (PRB (Physical RB))," a "PRB pair," an "RB pair," and so on.

Furthermore, a resource block may be comprised of one or more resource elements (REs). For example, one RE may be a radio resource field of one subcarrier and one symbol.

Note that the above-described structures of radio frames, subframes, slots, symbols and so on are merely examples. For example, configurations such as the number of subframes included in a radio frame, the number of slots included in a subframe, the number of symbols and RBs included in a slot, the number of subcarriers included in an RB, the number of symbols in a TTI, the symbol duration and the cyclic prefix (CP) duration can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control CHannel), PDCCH (Physical Downlink Control CHannel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and/or output via a plurality of network nodes.

The information, signals and so on that are input and/or output may be stored in a specific location (for example, a memory), or may be managed using a management table. The information, signals and so on to be input and/or output can be overwritten, updated or appended. The information, signals and so on that are output may be deleted. The information, signals and so on that are input may be transmitted to other pieces of apparatus.

Reporting of information is by no means limited to the aspects/embodiments described in this specification, and other methods may be used as well. For example, reporting of information may be implemented by using physical layer signaling (for example, downlink control information (DCI), uplink control information (UCI)), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)" and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information, or by reporting a different piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Furthermore, the radio base stations in this specification may be interpreted as user terminals. For example, each aspect/embodiment of the present invention may be applied to a configuration in which communication between a radio base station and a user terminal is replaced with communication among a number of user terminals (D2D (Device-to-Device)). In this case, user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base stations may, in some cases, be performed by higher nodes (upper nodes). In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to systems that use LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark) and other adequate radio communication methods, and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method of distinguishing between two or more elements. In this way, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure), ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in radio frequency fields, microwave regions and/or optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2016-182135, filed on Sep. 16, 2016, including the specification, drawings and abstract, is incorporated herein by reference in its entirety.

The invention claimed is:

1. A terminal comprising:
a processor that controls mapping of reference signals and modulation symbols of a shared channel in one symbol; and
a transmitter that transmits the reference signals and the modulation symbols using discrete Fourier transform (DFT),
wherein the processor inserts the reference signal in the modulation symbols before the DFT,
wherein the processor determines inserting positions of the reference signals based on a first information informed by higher layer signaling, and on a second information included in a downlink control information,
wherein the processor performs the DFT, and the transmitter transmits the reference signals and the modulation symbols after the DFT, and
wherein a number of sequences of the reference signal is determined per bandwidth to be allocated to the shared channel.

2. The terminal according to claim 1, wherein the modulation symbols are modulation symbols of control information.

3. A radio communication method for a terminal comprising:
controlling mapping of reference signals and modulation symbols of a shared channel in one symbol,
determining inserting positions of the reference signals based on a first information informed by higher layer signaling, and on a second information included in a downlink control information, inserting the reference signal in the modulation symbols before discrete Fourier transform (DFT); and transmitting the reference signals and the modulation symbols using the DFT, wherein the terminal performs the DFT, and transmits the reference signals and the modulation symbols after the DFT, and wherein a number of sequences of the reference signal is determined per bandwidth to be allocated to the shared channel.

4. A system comprising a terminal and a base station, wherein:

the terminal comprises:

a processor that controls mapping of reference signals and modulation symbols of a shared channel in one symbol; and a transmitter that transmits the reference signals and the modulation symbols using discrete Fourier transform (DFT); and the base station comprises:

a receiver that receives the shared channel with the DFT used;

wherein the processor in the terminal inserts the reference signal in the modulation symbols before the DFT, wherein the processor in the terminal determines inserting positions of the reference signals based on a first information informed by higher layer signaling, and on a second information included in a downlink control information, wherein the processor in the terminal performs the DFT, and the transmitter in the terminal transmits the reference signals and the modulation symbols after the DFT, and wherein a number of sequences of the reference signal is determined per bandwidth to be allocated to the shared channel.

* * * * *